(12) United States Patent
He et al.

(10) Patent No.: US 12,082,004 B2
(45) Date of Patent: Sep. 3, 2024

(54) ENHANCED USER EQUIPMENT ASSISTANCE INFORMATION MESSAGE

(71) Applicant: QUALCOMM Incorporated, San Diego, CA (US)

(72) Inventors: Linhai He, San Diego, CA (US); Huilin Xu, Temecula, CA (US); Jing Lei, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 568 days.

(21) Appl. No.: 17/377,204

(22) Filed: Jul. 15, 2021

(65) Prior Publication Data

US 2022/0022057 A1 Jan. 20, 2022

Related U.S. Application Data

(60) Provisional application No. 63/053,434, filed on Jul. 17, 2020.

(51) Int. Cl.
*H04W 24/02* (2009.01)
(52) U.S. Cl.
CPC ................................. *H04W 24/02* (2013.01)
(58) Field of Classification Search
CPC ..................................................... H04W 24/02
(Continued)

(56) References Cited

U.S. PATENT DOCUMENTS

2017/0142575 A1 5/2017 Quan et al.
2018/0103460 A1* 4/2018 Sharma ................ H04W 72/23
(Continued)

OTHER PUBLICATIONS

Apple, et al., "Signaling Support for CE Mode and Bandwidth Switch for FeMTC Devices", 3GPP Draft, 3GPP TSG-RAN WG2 #97, R2-1702318, 3rd Generation Partnership Project (3GPP), Mobile Competence Centre, 650, Route Des Lucioles, F-06921 Sophia-Antipolis Cedex, France, vol. RAN WG2, No. Athens, Greece, Feb. 13-17, 2017, Feb. 20, 2017 (Feb. 20, 2017), XP051237272, 3 Pages, Retrieved from the Internet: URL: http://www.3gpp.org/ftp/tsg_ran/WG2_RL2/TSGR2_97/Docs/. [Retrieved on Feb. 20, 2017], paragraph [0003], figure 1.

(Continued)

*Primary Examiner* — Gbemileke J Onamuti
(74) *Attorney, Agent, or Firm* — Loza & Loza, LLP/Qualcomm Incorporated

(57) ABSTRACT

A user equipment (UE) may request to change its radio resource control (RRC) parameters by transmitting a UE assistance information message to a base station. However, the existing RRC parameters that a UE may request to change via a UE assistance information message may not be inadequate for some UEs and may cause a high signaling overhead. The aspects described herein include an apparatus that obtains configuration information for a UE assistance information message, the configuration information indicating a set of parameters the apparatus is allowed to indicate in the UE assistance information message, the set of parameters including at least one of an operation complexity control parameter, a network coverage control parameter, or a channel monitoring control parameter. The apparatus transmits the UE assistance information message, wherein the UE assistance information message is based on at least a portion of the set of parameters.

28 Claims, 15 Drawing Sheets

(58) Field of Classification Search
USPC .......................................................... 370/328
See application file for complete search history.

(56) References Cited

U.S. PATENT DOCUMENTS

2020/0186991 A1    6/2020   He et al.
2022/0150829 A1*   5/2022   Yoon ................. H04W 52/0251

OTHER PUBLICATIONS

Huawei, et al., "UE Dynamic Adaptation to the Maximum Number of MIMO Layer", 3GPP TSG RAN WG1 Meeting#99, R1-1912916, Nov. 18, 2019 (Nov. 18, 2019), 3 pages, XP051823679, Retrieved from the Internet: URL: https://ftp.3gpp.org/tsg_ran/WG1_RL1/TSGR1_99/Docs/R1-1912916.zip. R1-1912916.docx p. 3, example "Proposal 1", the whole document.

International Search Report and Written Opinion—PCT/US2021/042081—ISA/EPO—Nov. 18, 2021.
Samsung: "UE Assistance Information for Energy Efficiency", 3GPP Draft, 3GPP TSG-RAN WG2 Meeting #98, R2-1705609, UE Assistance Information for Energy Efficiency, 3rd Generation Partnership Project (3GPP), Mobile Competence Centre, 650, Route Des Lucioles, F-06921 Sophia-Antipolis Cedex, vol. RAN WG2, No. Hangzhou, China, May 15-19, 2019, May 14, 2017 (May 14, 2017), XP051275932, 2 Pages Retrieved from the Internet: URL: http://www.3gpp.org/ftp/Meetings_3GPP_SYNC/RAN2/Docs/. [Retrieved on May 14, 2017], p. 2.
VIVO: "Discussion on UE Assistance Information", 3GPP Draft, 3GPP TSG RAN WG1 #97, R1-1906173, 3rd Generation Partnership Project (3GPP), Mobile Competence Centre, 650, Route Des Lucioles, F-06921 Sophia-Antipolis Cedex, France, vol. RAN WG1, No. Reno. USA, May 13-17, 2017, May 13, 2019 (May 13, 2019), XP051727627, 3 Pages, Retrieved from the Internet: URL: http://www.3gpp.org/ftp/Meetings%5F3GPP%5FSYNC/RAN1/Docs/R1%2D1906173%2Ezip. [Retrieved on May 13, 2019], paragraphs [02.1], [02.2], [02.3], table 4.

* cited by examiner

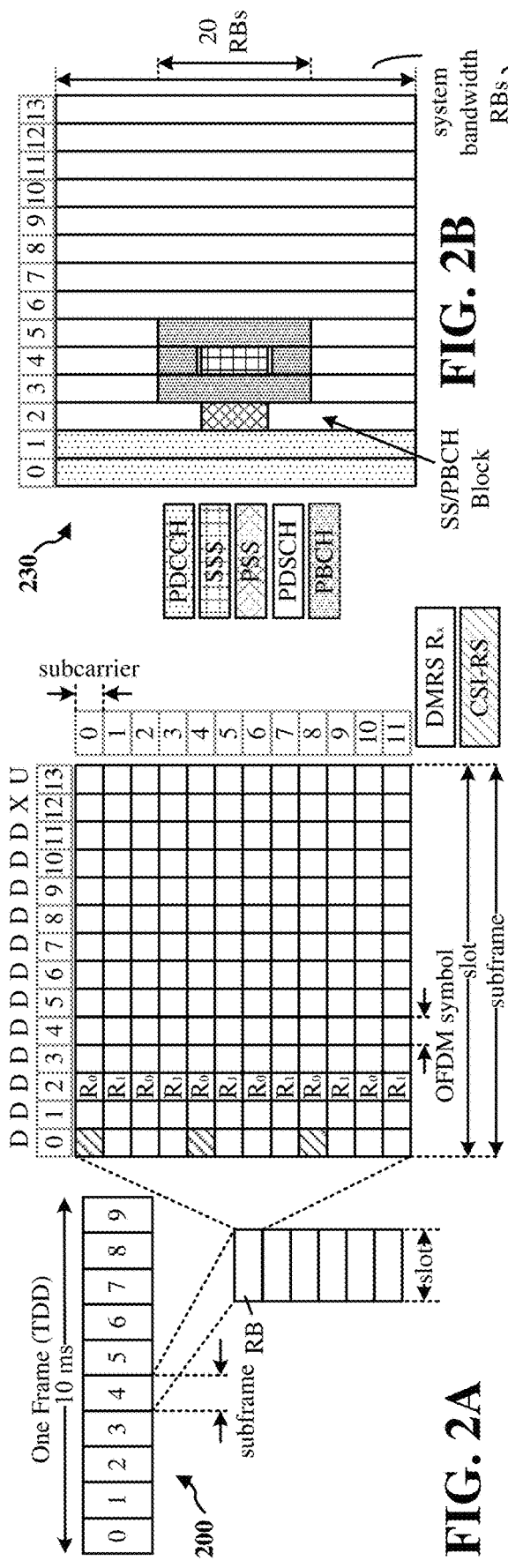
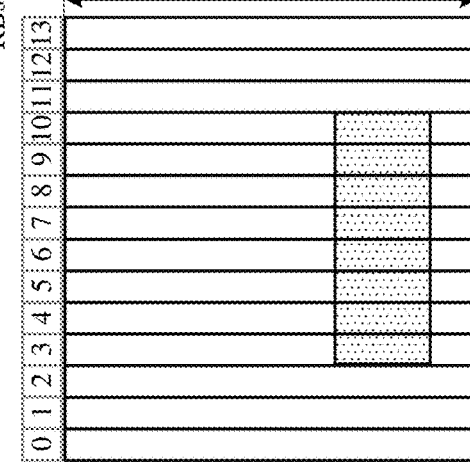
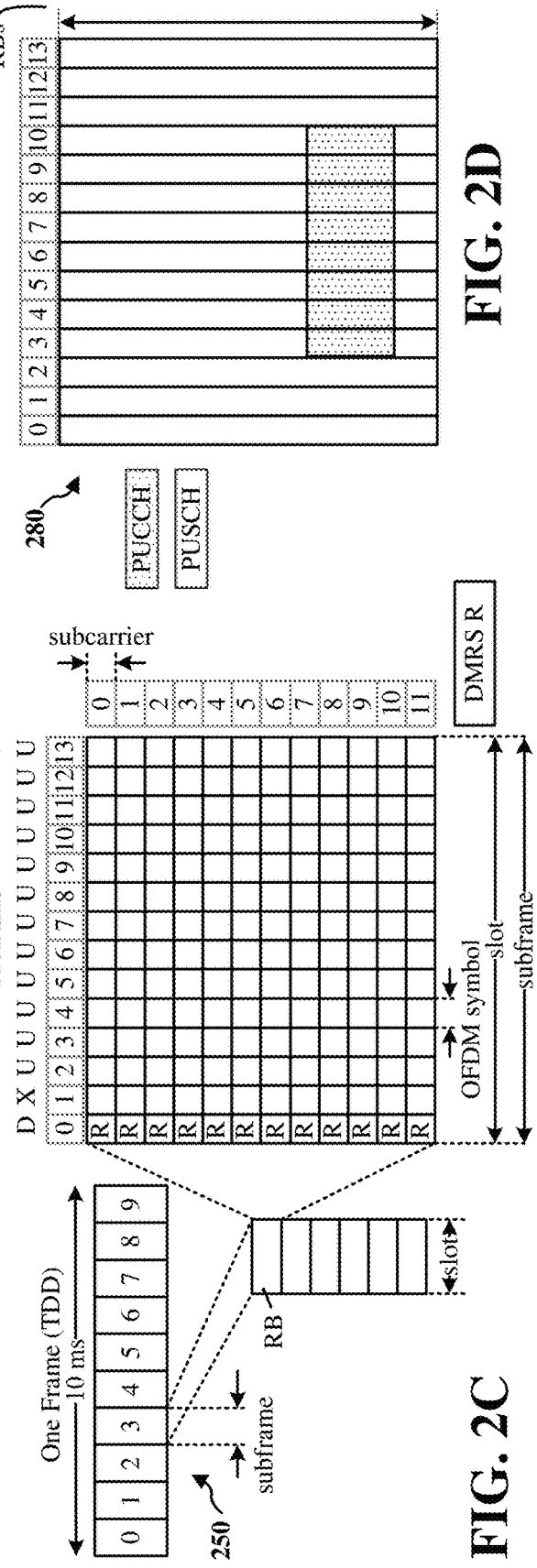
FIG. 2A  FIG. 2B  FIG. 2C  FIG. 2D

| UE Assistance Information (UAI) Parameters | |
|---|---|
| Preferred number of activated TCI states for PDCCH and PDSCH | 512 |
| Preferred scheduling offset granularity | 514 |
| Preferred concurrent scheduling configuration | 516 |
| Preferred half duplex slot format | 518 |
| UE preferred BWP index | 520 |
| Positioning information for simplified beam management, interference management | 522 |
| Mobility/speed information for simplified handover, closed-loop timing control, power control, resource allocation, L1/L3 measurements | 524 |
| Coverage level for DL/UL signals | 532 |
| UE preferred coverage enhancement scheme | 534 |
| UE's loss of antenna efficiency due to small form factor | 536 |
| Preferred aggregation level to process | 542 |
| Preferred maximum number of RB segments for a CORESET, and for all overlapping CORESETs | 544 |
| Preferred number of CORESETs per BWP | 546 |
| Preferred number of DCI sizes per slot, and across slots | 548 |
| Preferred number of DCI formats configured per search space set | 550 |
| Preferred number of buffered DL/UL DCI | 552 |
| Preferred minimum application delay in symbol or slot for SFI PDCCH | 554 |
| Preferred number of PDCCH blind decodes per slot | 556 |
| Preferred number of PDCCH CCEs per slot | 558 |
| Preferred number of common search spaces per BWP | 560 |
| Preferred number of UE-specific search spaces per BWP | 562 |
| Preferred minimum periodicity for all common search spaces | 564 |
| Preferred minimum periodicity for all UE-specific search spaces | 566 |

500 — 502

504 — Operation complexity control parameters

506 — Network coverage control parameters

508 — Channel monitoring control parameters

FIG. 5

| UAI Profile Index | UE Assistance Information (UAI) Parameters | Parameter Values |
|---|---|---|
| 1 | Parameter 1 | value — 814 |
| | Parameter 2 | value — 816 |
| | Parameter 3 | value — 818 |
| | Parameter 4 | value — 820 |
| | Parameter 5 | value — 822 |
| | Parameter 6 | value — 824 |
| | Parameter 7 | value — 826 |
| 2 | Parameter 8 | value — 828 |
| | Parameter 9 | value — 830 |
| | Parameter 10 | value — 832 |
| 3 | Parameter 11 | value — 834 |
| | Parameter 12 | value — 836 |
| | Parameter 13 | value — 838 |
| | Parameter 14 | value — 840 |
| | Parameter 15 | value — 842 |
| | Parameter 16 | value — 844 |
| | Parameter 17 | value — 846 |
| | Parameter 18 | value — 848 |
| | Parameter 19 | value — 850 |
| | Parameter 20 | value — 852 |
| | Parameter 21 | value — 854 |
| | Parameter 22 | value — 856 |
| | Parameter 23 | value — 858 |

802 — UAI Profile Index
804 — UE Assistance Information (UAI) Parameters
806 — Parameter Values
808 — First profile
810 — Second profile
812 — Third profile
800

FIG. 8

ENHANCED USER EQUIPMENT ASSISTANCE INFORMATION MESSAGE

CROSS REFERENCE TO RELATED APPLICATION(S)

This application claims the benefit of U.S. Provisional Application Ser. No. 63/053,434, entitled "ENHANCED USER EQUIPMENT ASSISTANCE INFORMATION MESSAGE" and filed on Jul. 17, 2020, which is expressly incorporated by reference herein in its entirety.

BACKGROUND

Technical Field

The present disclosure relates generally to communication systems, and more particularly, to an enhanced user equipment (UE) assistance information message.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

A UE may transmit a UE assistance information message to a network (e.g., a base station) to provide the network with information that may assist the network to configure radio parameters (also referred to as RRC parameters) in the UE. In some scenarios, the UE in an RRC connected state may be triggered to transmit the UE assistance information message when there is a change in the traffic (e.g., data traffic) or power state at the UE. For example, when a UE detects a change in traffic or a change in its power state, the UE may prefer to change one or more of its current RRC parameter values. For example, if the UE detects that its power state has changed from a plug in power source to an internal battery, the UE may conserve battery power by transmitting a UE assistance information message that changes one or more of its current RRC parameter values to values that effectively reduce the power consumption of the UE.

As different types of UEs (e.g., smartphones, wearables, etc.) are developed and introduced to wireless communication networks (e.g., 5G NR networks), and as the number and types of features supported by UEs continues to grow, the existing parameters (e.g., RRC parameters) that a UE may request to change via a UE assistance information message may not be inadequate. Moreover, the increasing number of RRC parameters that a UE may request to change via a UE assistance information message may cause a high signaling overhead. The aspects described herein overcome these issues.

In an aspect of the disclosure, a method, a computer-readable medium, and an apparatus are provided. The apparatus obtains configuration information for a user equipment (UE) assistance information message. The configuration information indicates a set of parameters the apparatus (e.g., a UE) is allowed to indicate in the UE assistance information message. The set of parameters includes at least one of an operation complexity control parameter, a network coverage control parameter, or a channel monitoring control parameter. The apparatus generates the UE assistance information message based on at least a portion of the set of parameters. The apparatus transmits the UE assistance information message.

In an aspect of the disclosure, an apparatus for wireless communication is provided. The apparatus includes means for obtaining configuration information for a user equipment (UE) assistance information message, the configuration information indicating a set of parameters the apparatus is allowed to indicate in the UE assistance information message, the set of parameters including at least one of an operation complexity control parameter, a network coverage control parameter, or a channel monitoring control parameter; and means for transmitting the UE assistance information message, wherein the UE assistance information message is based on at least a portion of the set of parameters.

In some aspects of the disclosure, the apparatus further includes means for receiving, from a base station, a radio resource control (RRC) reconfiguration message based on the UE assistance information message, and means for performing one or more operations based on the RRC reconfiguration message.

In some aspects of the disclosure, the configuration information further indicates a plurality of profiles based on the set of parameters, wherein each of the plurality of profiles is associated with a different index value.

In some aspects of the disclosure, at least two of the plurality of profiles includes a subset of the set of parameters and a unique combination of values for the subset of the set of parameters.

In some aspects of the disclosure, the plurality of profiles contains at least a first profile including a first subset of the set of parameters and a first set of values for the first subset of the set of parameters, and a second profile including a second subset of the set of parameters and a second set of values for the second subset of the set of parameters.

In some aspects of the disclosure, the UE assistance information message includes an index value of one of the plurality of profiles based on a performance objective of the UE.

In some aspects of the disclosure, the UE assistance information message includes a request to add a new parameter to at least one of the plurality of profiles or to add a new profile to the plurality of profiles.

In some aspects of the disclosure, the UE assistance information message includes a request to change a value of at least one parameter of a profile in the plurality of profiles.

In some aspects of the disclosure, the UE assistance information message includes a request to set a value for a parameter in the set of parameters, wherein the value serves as a request for an activation or deactivation of a feature of the UE.

In some aspects of the disclosure, the feature is a control channel monitoring operation or an uplink transmission on one or more carriers.

In some aspects of the disclosure, the operation complexity control parameter is a parameter for indicating a number of activated transmission configuration indicator (TCI) states for a downlink control channel and a downlink shared channel, a parameter for indicating a scheduling offset granularity, a parameter for indicating a concurrent scheduling configuration, a parameter for indicating a half-duplex slot format, a parameter for indicating a bandwidth part (BWP) index, a parameter for enabling or disabling a use of positioning information for beam management or interference management In some aspects of the disclosure, the operation complexity control parameter is a parameter for enabling or disabling a use of mobility information or speed information for at least one of a handover operation, a closed-loop timing control operation, a power control operation, a resource allocation, a physical layer measurement, or a radio resource control layer measurement.

In some aspects of the disclosure, the network coverage control parameter is a parameter for indicating a coverage level for at least one of a downlink signal or an uplink signal, a parameter for indicating a coverage enhancement scheme, or a parameter for indicating a loss of antenna efficiency resulting from a reduced form factor of the apparatus.

In some aspects of the disclosure, the channel monitoring control parameter is a parameter for indicating an aggregation level for the apparatus to process, a parameter for indicating a maximum number of resource block (RB) segments for a control resource set (CORESET) and for overlapping CORESETs, a parameter for indicating a number of CORESETs for a bandwidth part (BWP), a parameter for indicating a number of downlink control information (DCI) sizes for a slot and across slots, a parameter for indicating a preferred number of downlink control information (DCI) formats configured for each of a search space set, a parameter for indicating a number of buffered downlink DCI messages and/or uplink DCI messages, or a parameter for indicating a minimum application delay in a symbol or a slot for a slot format indicator (SFI) downlink control channel.

In some aspects of the disclosure, the channel monitoring control parameter is a parameter for indicating a number of blind decodes in a slot for a control channel, a parameter for indicating a number of control channel elements (CCEs) for each slot of a control channel, a parameter for indicating a number of common search spaces for a bandwidth part (BWP), a parameter for indicating a preferred number of search spaces associated with the apparatus for the bandwidth part (BWP), a parameter for indicating a minimum periodicity for common search spaces, or a parameter for indicating a minimum periodicity for the search spaces associated with the apparatus.

In an aspect of the disclosure, a computer-readable medium storing computer executable code is provided. The code when executed by a processor cause the processor to obtain configuration information for a user equipment (UE) assistance information message, the configuration information indicating a set of parameters a user equipment (UE) is allowed to indicate in the UE assistance information message, the set of parameters including at least one of an operation complexity control parameter, a network coverage control parameter, or a channel monitoring control parameter, and transmit the UE assistance information message, wherein the UE assistance information message is based on at least a portion of the set of parameters.

In an aspect of the disclosure, the code when executed by the processor further cause the processor to receive, from a base station, a radio resource control (RRC) reconfiguration message based on the UE assistance information message, and perform one or more operations based on the RRC reconfiguration message.

In an aspect of the disclosure, the configuration information further indicates a plurality of profiles based on the set of parameters, and wherein each of the plurality of profiles is associated with a different index value.

In an aspect of the disclosure, at least two of the plurality of profiles includes a subset of the set of parameters and a unique combination of values for the subset of the set of parameters.

In an aspect of the disclosure, the plurality of profiles contains at least a first profile including a first subset of the set of parameters and a first set of values for the first subset of the set of parameters, a second profile including a second subset of the set of parameters and a second set of values for the second subset of the set of parameters.

In an aspect of the disclosure, the UE assistance information message includes an index value of one of the plurality of profiles based on a performance objective of the UE.

In an aspect of the disclosure, the UE assistance information message includes a request to add a new parameter to at least one of the plurality of profiles or to add a new profile to the plurality of profiles.

In an aspect of the disclosure, the UE assistance information message includes a request to change a value of at least one parameter of a profile in the plurality of profiles.

In an aspect of the disclosure, the UE assistance information message includes a request to set a value for a parameter in the set of parameters, wherein the value serves as a request for an activation or deactivation of a feature of the UE.

In an aspect of the disclosure, the feature is a control channel monitoring operation or an uplink transmission on one or more carriers.

In an aspect of the disclosure, the operation complexity control parameter is a parameter for indicating a number of activated transmission configuration indicator (TCI) states for a downlink control channel and a downlink shared channel, a parameter for indicating a scheduling offset granularity, a parameter for indicating a concurrent scheduling configuration, a parameter for indicating a half-duplex slot format, a parameter for indicating a bandwidth part (BWP) index, a parameter for enabling or disabling a use of positioning information for beam management or interference management.

In an aspect of the disclosure, the operation complexity control parameter is a parameter for enabling or disabling a use of mobility information or speed information for at least one of a handover operation, a closed-loop timing control operation, a power control operation, a resource allocation, a physical layer measurement, or a radio resource control layer measurement.

In an aspect of the disclosure, the network coverage control parameter is a parameter for indicating a coverage level for at least one of a downlink signal or an uplink signal, a parameter for indicating a coverage enhancement scheme, or a parameter for indicating a loss of antenna efficiency resulting from a reduced form factor of the UE.

In an aspect of the disclosure, the channel monitoring control parameter is a parameter for indicating an aggregation level for the UE to process, a parameter for indicating a maximum number of resource block (RB) segments for a control resource set (CORESET) and for overlapping CORESETs, a parameter for indicating a number of CORESETs for a bandwidth part (BWP), a parameter for indicating a number of downlink control information (DCI) sizes for a slot and across slots, a parameter for indicating a preferred number of DCI formats configured for each of a search space set, a parameter for indicating a number of buffered downlink DCI messages and/or uplink DCI messages, or a parameter for indicating a minimum application delay in a symbol or a slot for a slot format indicator (SFI) downlink control channel.

In an aspect of the disclosure, the channel monitoring control parameter is a parameter for indicating a number of blind decodes in a slot for a control channel, a parameter for indicating a number of control channel elements (CCEs) for each slot of a control channel, a parameter for indicating a number of common search spaces for a bandwidth part (BWP), a parameter for indicating a preferred number of search spaces associated with the UE for the bandwidth part (BWP), a parameter for indicating a minimum periodicity for common search spaces, or a parameter for indicating a minimum periodicity for the search spaces associated with the UE.

In an aspect of the disclosure, a method, a computer-readable medium, and an apparatus are provided. An apparatus for wireless communication includes a memory and at least one processor coupled to the memory and configured to: transmit, to a user equipment (UE), configuration information for a UE assistance information message, the configuration information indicating a set of parameters the UE is allowed to indicate in the UE assistance information message, the set of parameters including at least one of an operation complexity control parameter, a network coverage control parameter, or a channel monitoring control parameter; and receive the UE assistance information message from the UE, wherein the UE assistance information message is based on at least a portion of the set of parameters.

In some aspects, the at least one processor is further configured to: transmit, to the UE, a radio resource control (RRC) reconfiguration message based on the UE assistance information message.

In some aspects, the configuration information further indicates a plurality of profiles based on the set of parameters, and wherein each of the plurality of profiles is associated with a different index value. In some aspects, at least two of the plurality of profiles includes a subset of the set of parameters and a unique combination of values for the subset of the set of parameters. In some aspects, the plurality of profiles contains at least a first profile including a first subset of the set of parameters and a first set of values for the first subset of the set of parameters; and a second profile including a second subset of the set of parameters and a second set of values for the second subset of the set of parameters. In some aspects, the UE assistance information message includes an index value of one of the plurality of profiles based on a performance objective of the UE. In some aspects, the UE assistance information message includes a request to add a new parameter to at least one of the plurality of profiles or to add a new profile to the plurality of profiles. In some aspects, the UE assistance information message includes a request to change a value of at least one parameter of a profile in the plurality of profiles.

In some aspects, the UE assistance information message includes a request to set a value for a parameter in the set of parameters, wherein the value serves as a request for an activation or deactivation of a feature of the UE. In some aspects, the feature is a control channel monitoring operation or an uplink transmission on one or more carriers.

In some aspects, the operation complexity control parameter is a parameter for indicating a number of activated transmission configuration indicator (TCI) states for a downlink control channel and a downlink shared channel, a parameter for indicating a scheduling offset granularity, a parameter for indicating a concurrent scheduling configuration, a parameter for indicating a half-duplex slot format, a parameter for indicating a bandwidth part (BWP) index, a parameter for enabling or disabling a use of positioning information for beam management or interference management.

In some aspects, the operation complexity control parameter is a parameter for enabling or disabling a use of mobility information or speed information for at least one of a handover operation, a closed-loop timing control operation, a power control operation, a resource allocation, a physical layer measurement, or a radio resource control layer measurement. In some aspects, the network coverage control parameter is a parameter for indicating a coverage level for at least one of a downlink signal or an uplink signal, a parameter for indicating a coverage enhancement scheme, or a parameter for indicating a loss of antenna efficiency resulting from a reduced form factor of the UE.

In some aspects, the channel monitoring control parameter is a parameter for indicating an aggregation level for the UE to process, a parameter for indicating a maximum number of resource block (RB) segments for a control resource set (CORESET) and for overlapping CORESETs, a parameter for indicating a number of CORESETs for a bandwidth part (BWP), a parameter for indicating a number of downlink control information (DCI) sizes for a slot and across slots, a parameter for indicating a preferred number of downlink control information (DCI) formats configured for each of a search space set, a parameter for indicating a number of buffered downlink DCI messages and/or uplink DCI messages, or a parameter for indicating a minimum application delay in a symbol or a slot for a slot format indicator (SFI) downlink control channel.

In some aspects, the channel monitoring control parameter is a parameter for indicating a number of blind decodes in a slot for a control channel, a parameter for indicating a number of control channel elements (CCEs) for each slot of a control channel, a parameter for indicating a number of common search spaces for a bandwidth part (BWP), a parameter for indicating a preferred number of search spaces associated with the UE for the bandwidth part (BWP), a parameter for indicating a minimum periodicity for common search spaces, or a parameter for indicating a minimum periodicity for the search spaces associated with the UE.

In an aspect of the disclosure, an apparatus for wireless communication transmits, to a user equipment (UE), configuration information for a UE assistance information message, the configuration information indicating a set of parameters the UE is allowed to indicate in the UE assistance information message, the set of parameters including at least one of an operation complexity control parameter, a network coverage control parameter, or a channel monitoring control parameter; and receives the UE assistance information message from the UE, wherein the UE assistance information message is based on at least a portion of the set of parameters. In some aspects, the apparatus transmits, to the UE, a radio resource control (RRC) reconfiguration message based on the UE assistance information message.

In an aspect of the disclosure, an apparatus for wireless communication includes means for transmitting, to a user equipment (UE), configuration information for a UE assistance information message, the configuration information indicating a set of parameters the UE is allowed to indicate in the UE assistance information message, the set of parameters including at least one of an operation complexity control parameter, a network coverage control parameter, or a channel monitoring control parameter; and means for receiving the UE assistance information message from the UE, wherein the UE assistance information message is based on at least a portion of the set of parameters. In some aspects, the apparatus further includes means for transmitting, to the UE, a radio resource control (RRC) reconfiguration message based on the UE assistance information message.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 2A, 2B, 2C, and 2D are diagrams illustrating examples of a first 5G/NR frame, DL channels within a 5G/NR subframe, a second 5G/NR frame, and UL channels within a 5G/NR subframe, respectively.

FIG. 5 illustrates an example set of UE assistance information parameters that a UE may be allowed to indicate in a UE assistance information message.

FIG. 8 illustrates a diagram including one or more profiles based on the set of parameters and a different index value associated with each profile in accordance with various aspects of the present disclosure.

DETAILED DESCRIPTION

Figure 1:
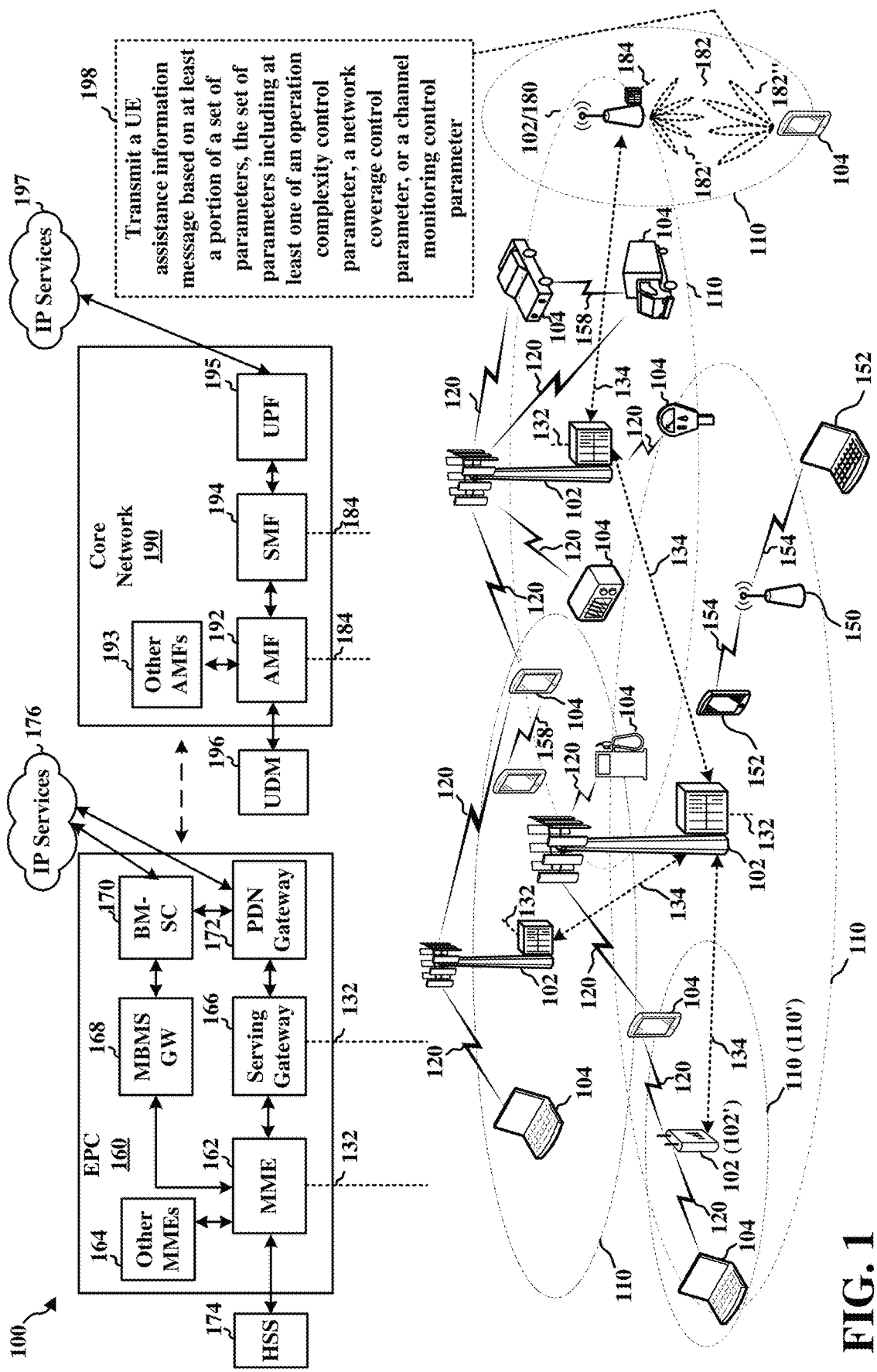
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., S1 interface). The base stations 102 configured for 5G NR (collectively referred to as Next Generation RAN (NG-RAN)) may interface with core network 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (e.g., 3 GHz-300 GHz) has extremely high path loss and a short range. The mmW base station 180 may utilize beamforming 182 with the UE 104 to compensate for the extremely high path loss and short range.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may be configured to transmit a UE assistance information message based on at least a portion of a set of parameters, the set of parameters including at least one of an operation complexity control parameter, a network coverage control parameter, or a channel monitoring control parameter (198). Although the following description may be focused on 5G NR, the concepts described herein may be applicable to other similar areas, such as LTE, LTE-A, CDMA, GSM, and other wireless technologies.

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies μ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and $2^\mu$ slots/subframe. The subcarrier spacing and symbol length/duration are a function of the numerology. The subcarrier spacing may be equal to $2^\mu * 15$ kKz, where μ is the numerology 0 to 5. As such, the numerology μ=0 has a subcarrier spacing of 15 kHz and the numerology μ=5 has a subcarrier spacing of 480 kHz. The symbol length/duration is inversely related to the subcarrier spacing. FIGS. 2A-2D provide an example of slot configuration 0 with 14 symbols per slot and numerology μ=0 with 1 slot per subframe. The subcarrier spacing is 15 kHz and symbol duration is approximately 66.7 μs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
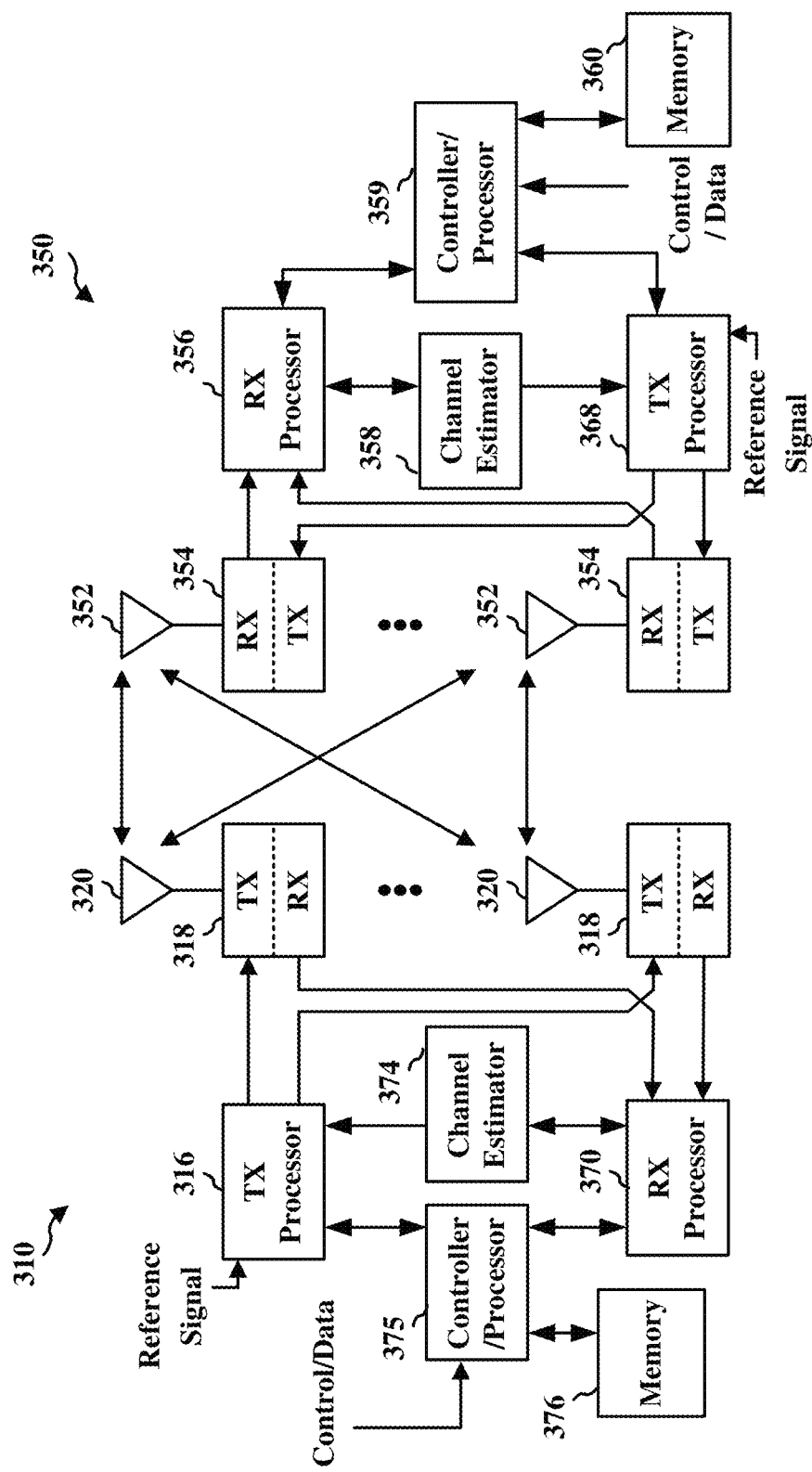
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. 1.

Figure 4:
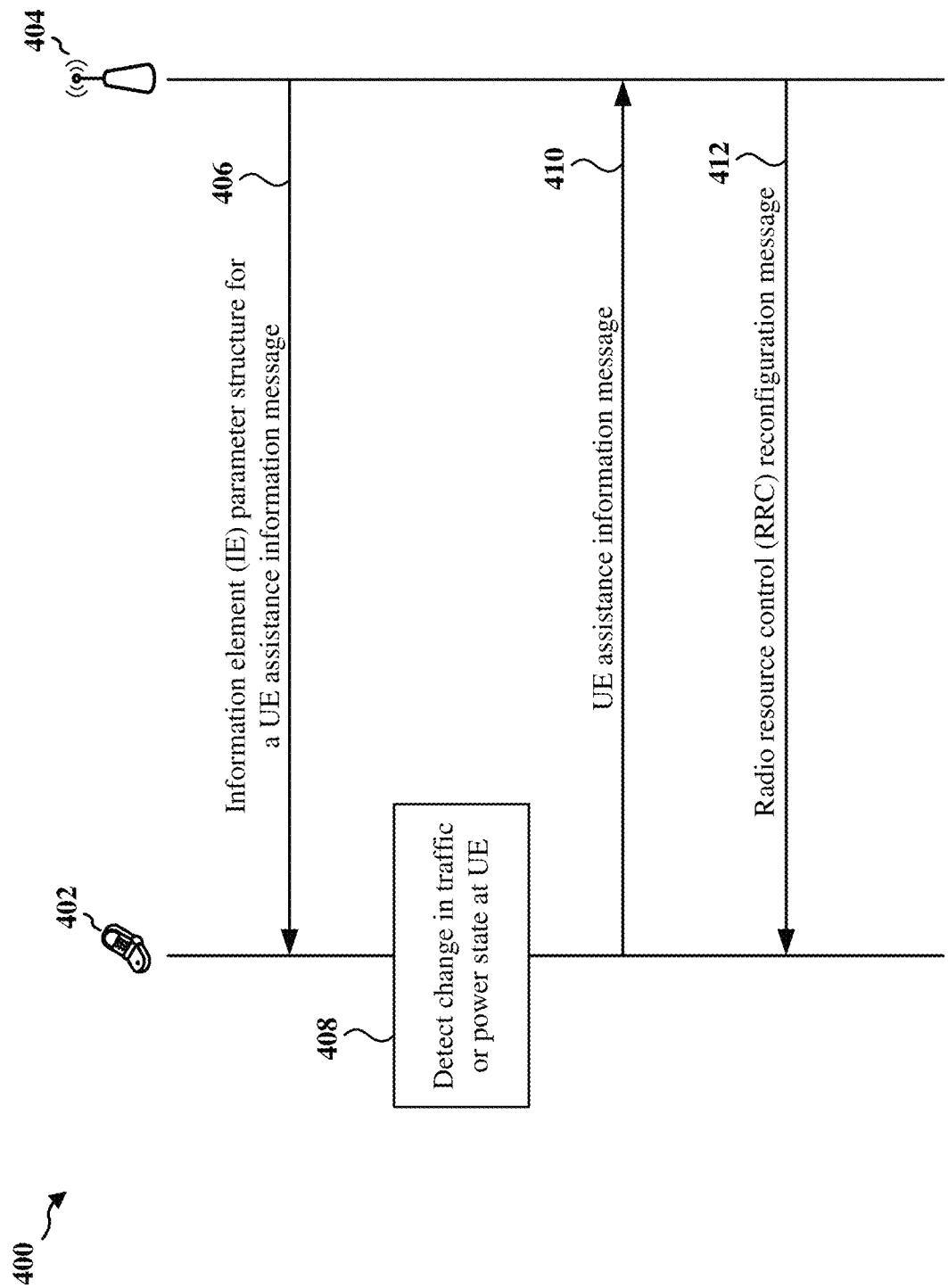
FIG. 4 illustrates a signal flow diagram showing an example transmission of a UE assistance information message.

A UE may transmit a UE assistance information message to a network (e.g., a base station) to provide the network with information that may assist the network to configure radio parameters (also referred to as RRC parameters) in the UE. In some scenarios, the UE in an RRC connected state may be triggered to transmit the UE assistance information message when there is a change in the traffic (e.g., data traffic) or power state at the UE. The UE assistance information message may be distinguished from a UE capability report in that the UE assistance information message allows the UE to dynamically request the radio resource configuration that it prefers after an RRC connection has been established. With regard to a UE capability report, however, the UE may not be able to change its indicated capabilities after the RRC connection has been established. FIG. 4 illustrates a signal flow diagram 400 showing an example transmission of a UE assistance information message.

As shown in FIG. 4, a base station 404 may transmit a message 406 including an information element (IE) parameter structure for a UE assistance information message. When the UE 402 detects 408 a change in traffic (e.g., data traffic) or a change in the power state of the UE 402, for example, the UE 402 may prefer to change one or more of its current RRC parameter values. Accordingly, the UE 402 may transmit a UE assistance information message 410 that includes its preferred values for one or more RRC parameters.

In some examples, the UE 402 may use the UE assistance information message 410 to indicate preferred values for configurations and parameters related to power savings. For example, such configurations and parameters may include discontinuous reception (DRX) configurations, a maximum aggregated bandwidth parameter, a maximum number of carriers parameter, a maximum number of MIMO layers parameter, and/or a minimum time gap for cross-slot scheduling parameter.

In one example scenario, the UE 402 may be plugged in to a power source and may be using four carriers to communicate with the network (e.g., the base station 404). When the power state of the UE 402 changes to a battery powered mode (e.g., when the UE 402 is no longer plugged in to the power source), the performance objective of the UE 402 may be to improve battery performance (e.g., reduce power consumption to conserve battery power). Accordingly, the UE 402 may prefer to reduce its number of carriers from four carriers to one carrier (e.g., since the use of one carrier consumes less power than four carriers). In this scenario, the UE 402 may transmit a UE assistance information message that requests to change a value of a parameter that sets the maximum number of carriers. For example, the UE 402 may request that the parameter that sets the maximum number of carriers be set to a value indicating one carrier.

Upon receiving the UE assistance information message 410, the base station 404 may adjust or override the RRC parameters of the UE 402 using dedicated radio resource control (RRC) signaling. For example, as shown in FIG. 4, the base station 404 may transmit an RRC reconfiguration message 412 that sets the RRC parameters of the UE 402 based on the preferred values in the UE assistance information message 410.

Some types of UEs in a network may have reduced capabilities (also referred to as reduced capability (RedCap) UEs). Such UEs with reduced capabilities may include, for example, wearables (e.g., smart wearables, such as smartwatches), industrial wireless sensor networks (IWSN), surveillance cameras, low-end smartphones, and/or relaxed IoT devices. For example, UEs with reduced capabilities typically have more capability (e.g., processing capacity, features, battery performance, etc.) than an IoT device (e.g., a Narrowband Internet of Things (NB-IoT) device) but less capability than premium UEs (e.g., Enhanced Mobile Broadband (eMBB) smartphones). NB-IoT is a Low Power Wide Area Network (LPWAN) radio technology for IoT devices. An NB-IoT device may generate small amounts of data (e.g., low traffic) and may have a low duty cycle. These features may make NB-IoT devices suitable for use in electric/utility meters, for example. UEs with reduced capabilities (e.g., smartwatches) typically generate more traffic than NB-IoT devices but less traffic than eMBB smartphones. Moreover, UEs with reduced capabilities are typically more sensitive to power consumption than eMBB smartphones.

Release 15 and Release 16 of the 3GPP specification generally focus on premium UEs (e.g., eMBB smartphones) and other specific types of devices (e.g., devices supporting URLLC, vehicle-to-everything (V2X) devices). For future releases of the 3GPP specification (e.g., Release 17), there exists a need to improve 5G NR network scalability and deployment with efficient and cost-effective solutions. For example, there is a need to reduce power consumption in UEs and to reduce system overhead, while lowering costs. In future releases of the 3GPP specification, for example, peak throughput, latency, and/or reliability requirements for UEs may be relaxed.

UEs with reduced capabilities may benefit from the use of UE assistance information because these types of UEs are sensitive to power consumption and many of the radio capabilities of these types of UEs are expected to be reduced. The wireless communication configurations of UEs with reduced capabilities typically need to be dynamically adjusted and may need more frequent adjustments relative to premium UEs (e.g., eMBB smartphones) to improve battery performance. In some examples, a UE with reduced capabilities may use the UE assistance information (e.g., may transmit a UE assistance information message) to dynamically adjust its wireless communication configurations, thereby enabling the UE with reduced capabilities to achieve a desired level of performance while improving battery life.

For example, if a UE with reduced capabilities is implemented as a smartwatch, the smartwatch may employ its full capabilities (e.g., the use of a modem device in the smartwatch) to make a phone call. After the phone call ends, however, the smartwatch may no longer need to employ its full capabilities. For example, the smartwatch may no longer need to use a modem device in the smartwatch and may be configured to employ other components that consume less power to receive notifications from the network. Accordingly, the smartwatch may use the UE assist information to request the network to reduce its capabilities (e.g., disable use of the modem device) to conserve battery power.

In some aspects of the present disclosure, a UE may be allowed to indicate preferred values for operation complexity control parameters, network coverage control parameters, and/or channel monitoring control parameters in a UE assistance information message. In some examples, the operation complexity control parameters and/or the network coverage control parameters may allow a UE with reduced capabilities to request parameter values suitable for its radio and processing capabilities.

For example, a UE with reduced capabilities may indicate values for the operation complexity control parameters and/or network coverage control parameters that avoid or reduce demanding operations that may unnecessarily burden the memory and/or hardware resources of the UE with reduced capabilities. In some aspects of the disclosure, a new information element (IE) for indicating the operation complexity control parameters and/or the network coverage control parameters may be added to existing UE assistance information IEs.

In some examples, the channel monitoring control parameters may serve as power savings parameters. For example, the channel monitoring control parameters may allow a UE to request parameter values associated with radio resource configurations that have an impact on the power consumption of the UE. In some aspects of the disclosure, existing information elements (IEs) in UE assistance information for indicating power savings parameters may be extended to include the channel monitoring control parameters. FIG. 5 illustrates a diagram 500 including an example set of UE assistance information parameters 502 (also referred to as UAI parameters 502) that a UE may be allowed to indicate in a UE assistance information message.

As shown in FIG. 5, the set of UE assistance information parameters 502 includes operation complexity control parameters 504, network coverage control parameters 506, and channel monitoring control parameters 508. In the example of FIG. 5, the operation complexity control parameters 504 may include a parameter 512 for indicating a preferred number of activated transmission configuration indicator (TCI) states for a downlink control channel (e.g., PDCCH) and a downlink shared channel (e.g., PDSCH), and a parameter 514 for indicating a preferred scheduling offset granularity. For example, the scheduling offset granularity may be a symbol, a span, or a slot. The operation complexity control parameters 504 may further include a parameter 516 for indicating a preferred concurrent scheduling configuration. For example, the preferred concurrent scheduling configuration may include concurrent higher layer and dynamic scheduling or no concurrent scheduling. The operation complexity control parameters 504 may further include a parameter 518 for indicating a preferred half-duplex slot format. For example, the UE may use the parameter 518 to request a change of a downlink/uplink ratio in a slot when the UE is limited for half-duplex communication and is operating on a paired spectrum.

The operation complexity control parameters 504 may further include a parameter 520 for indicating a UE preferred bandwidth part (BWP) index. For example, a BWP index may identify a certain portion (e.g., a frequency range) of the system bandwidth (e.g., a total channel bandwidth of a base station) allocated to the UE. The portion of the system bandwidth allocated to the UE may be referred to as a BWP. For example, the UE may use the parameter 520 to request a change or switch of a BWP. The operation complexity control parameters 504 may further include a parameter 522 for enabling or disabling use of positioning information (e.g., Global Positioning System (GPS) coordinates, data from one or more motion or positioning sensors, etc.) for simplified beam management, interference management, and/or other suitable operations. The operation complexity control parameters 504 may further include a parameter 524 for enabling or disabling use of mobility and/or speed information (e.g., GPS coordinates, data from one or more motion or positioning sensors, etc.) for a simplified handover operation, a closed-loop timing control operation, a power control operation, a resource allocation, a physical layer (e.g., L1) measurement, a radio resource control layer (e.g., L3) measurement, and/or other suitable operations.

In the example of FIG. 5, the network coverage control parameters 506 may include a parameter 532 for indicating a coverage level for at least one of a downlink signal or an uplink signal. For example, the UE may use the parameter 532 to indicate a preferred number of repetitions for DL and/or UL signals. The network coverage control parameters 506 may further include a parameter 534 for indicating a UE preferred coverage enhancement scheme. For example, the preferred coverage enhancement scheme may include repetitions of DL and/or UL signals, frequency hopping, transport block size (TBS) scaling, and/or other suitable operations. The network coverage control parameters 506 may further include a parameter 536 for indicating a UE's loss of antenna efficiency resulting from a reduced form factor of the UE.

In the example of FIG. 5, the channel monitoring control parameters 508 may include a parameter 542 for indicating a preferred aggregation level for the UE to process, a parameter 544 for indicating a preferred maximum number of resource block (RB) segments for a control resource set (CORESET) and for all overlapping CORESETs, and a parameter 546 for indicating a preferred number of CORESETs per bandwidth part (BWP). The channel monitoring control parameters 508 may further include a parameter 548 for indicating a preferred number of downlink control information (DCI) sizes for a slot and across slots, a parameter 550 for indicating a preferred number of DCI formats configured per search space set, and a parameter 552 for indicating a preferred number of buffered DL/UL DCI messages.

The channel monitoring control parameters 508 may further include a parameter 554 for indicating a preferred minimum application delay in a symbol or slot for a slot format indicator (SFI) downlink control channel (e.g., SFI-PDCCH), a parameter 556 for indicating a preferred number of PDCCH blind decodes per slot, and a parameter 558 for a preferred number of control channel elements (CCEs) for each slot of a control channel (e.g., a number of PDCCH CCEs per slot). The channel monitoring control parameters 508 may further include a parameter 560 for indicating a preferred number of common search spaces for a BWP, a parameter 562 for indicating a preferred number of search spaces associated with the UE for a BWP (e.g., a preferred number of UE-specific search spaces per BWP), a parameter 564 for indicating a preferred minimum periodicity for all common search spaces, and a parameter 566 for indicating a preferred minimum periodicity for the search spaces associated with the UE (e.g., a preferred minimum periodicity for all UE-specific search spaces). In some examples, the channel monitoring control parameters 508 may be used for reduced control channel monitoring at a UE (e.g., a UE with reduced capabilities).

Figure 6:
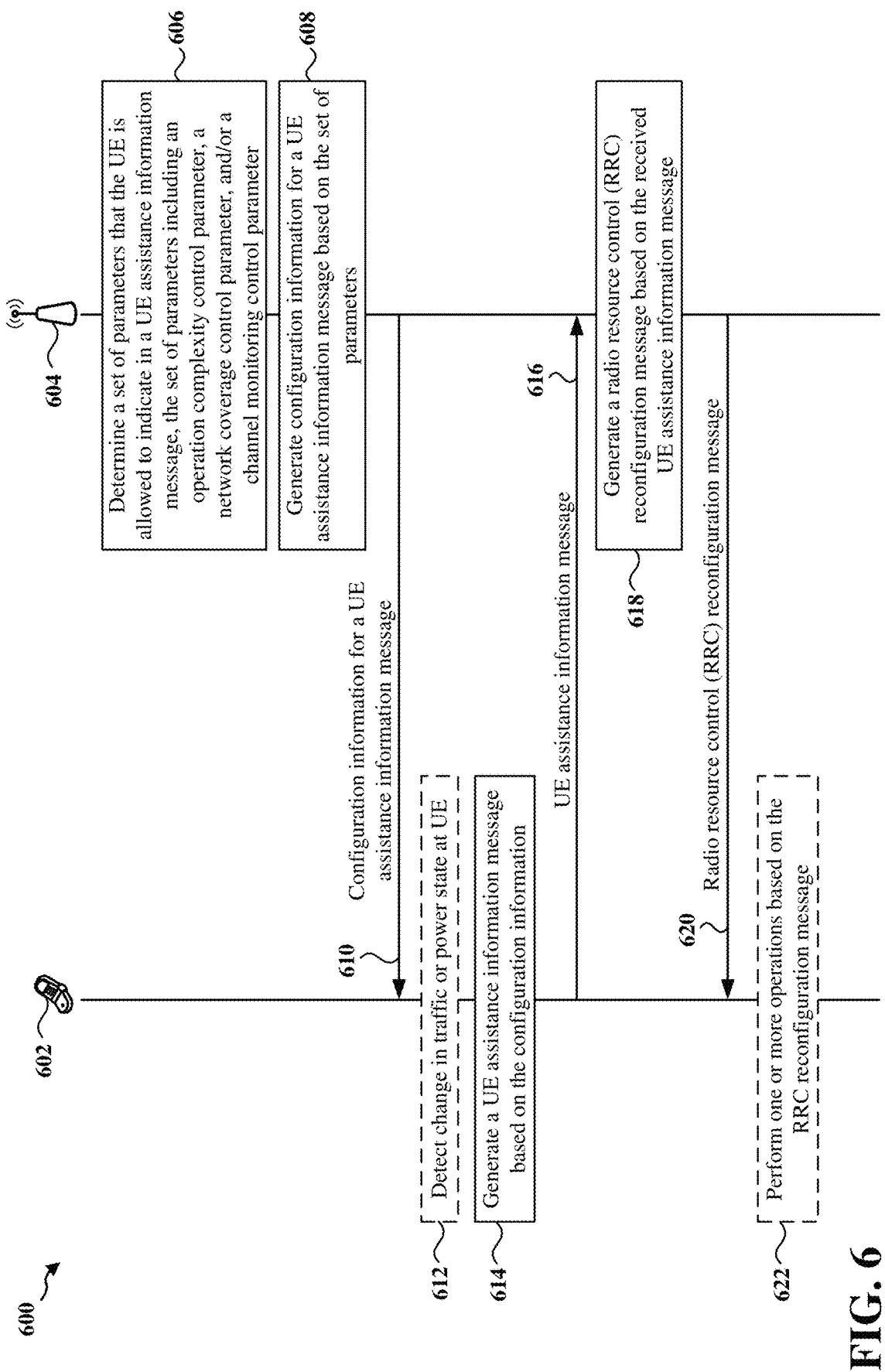
FIG. 6 illustrates a signal flow diagram showing an example transmission of a UE assistance information message in accordance with various aspects of the present disclosure.

FIG. 6 illustrates a signal flow diagram 600 showing an example transmission of a UE assistance information message (also referred to as an enhanced UE assistance information message) in accordance with various aspects of the present disclosure. With reference to FIG. 6, at 606, a base station 604 may determine a set of parameters that a UE 602 is allowed to indicate in a UE assistance information message. In some examples, the UE 602 may be a premium UE (e.g., an eMBB smartphone) or a UE with reduced capabilities (e.g., a smartwatch) as described herein. The set of parameters may include at least one of an operation complexity control parameter, a network coverage control parameter, or a channel monitoring control parameter. In some examples, and with reference to FIG. 5, the set of parameters may include one or more of the operation complexity control parameters 504, one or more of the network coverage control parameters 506, and/or one or more of the channel monitoring control parameters 508.

At 608, the base station 604 may generate configuration information for the UE assistance information message based on the set of parameters. In some aspects of the disclosure, the configuration information may include a structure of an information element (IE) that the UE 602 may use to indicate parameters in a UE assistance information message. For example, the configuration information may indicate a number of bit fields of the IE and a parameter corresponding to each of the bit fields.

In some aspects of the disclosure, the configuration information may include one or more profiles based on the set of parameters and a different index value associated with each profile. In one example, with reference to FIG. 7, the base station 604 may generate multiple profiles by selecting a subset (e.g., parameter 1 through parameter N) of the set of parameters for the profiles. As shown in the UE assistance information parameters 704 in FIG. 7, for example, the base station 604 may select a subset of parameters (e.g., parameter 1 through parameter N) and may use the subset of parameters to generate a first profile 708, a second profile 710, and so on up to a Kth profile 712. It should be noted that the first profile 708, the second profile 710, and the Kth profile 712 may each include the subset of parameters. In some examples, the base station 604 may configure the parameters in each profile (e.g., the first profile 708, second profile 710, and the Kth profile 712) with a unique combination of values.

Figure 7:
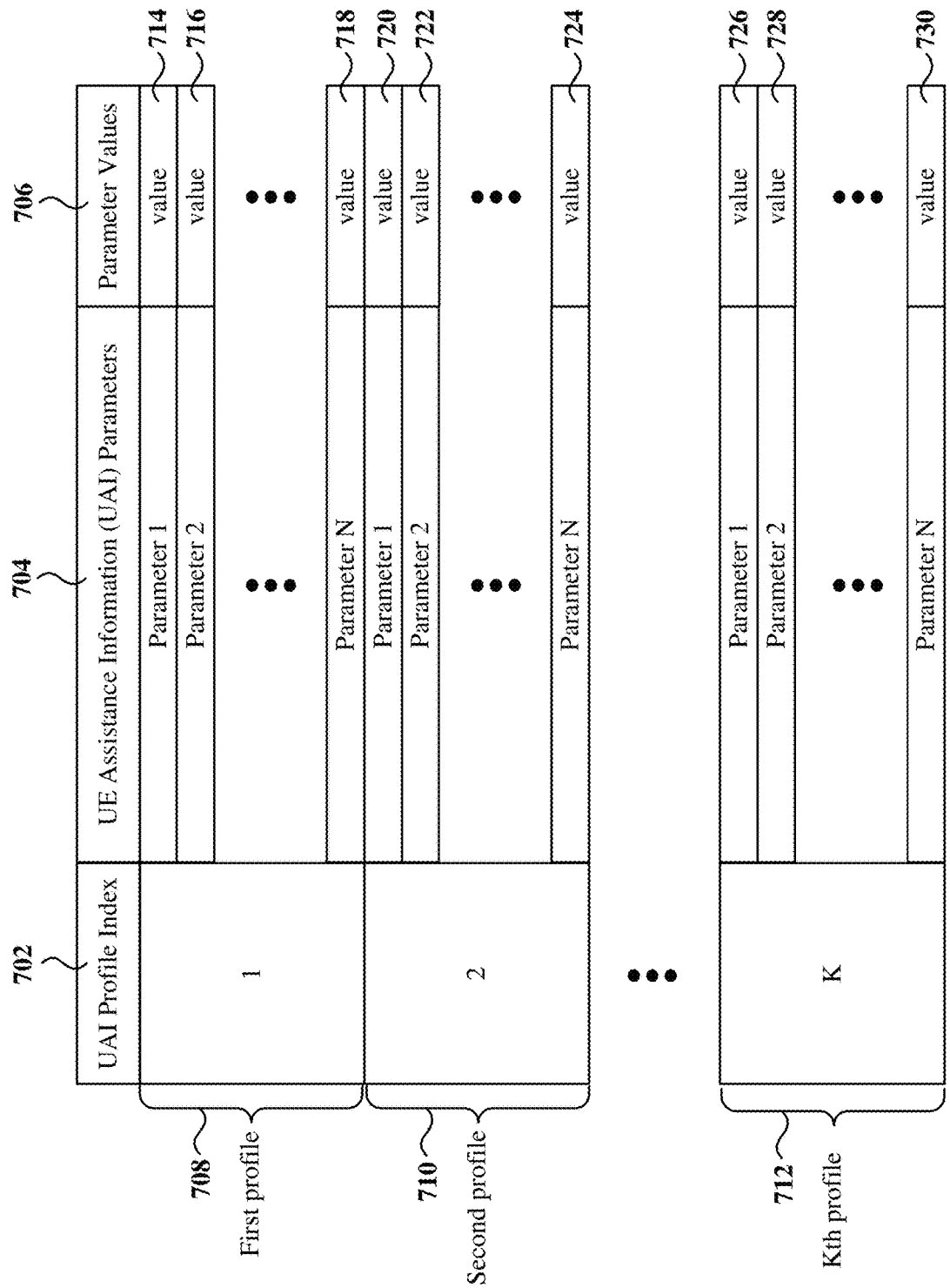
FIG. 7 illustrates one or more profiles based on the set of parameters and a different index value associated with each profile in accordance with various aspects of the present disclosure.

For example, with reference to the first profile 708 in FIG. 7, the value for parameter 1 may be set to value 714, the value for parameter 2 may be set to value 716, and the value for parameter N may be set to value 718. With reference to the second profile 710 in FIG. 7, the value for parameter 1 may be set to value 720, the value for parameter 2 may be set to value 722, and the value for parameter N may be set to value 724. With reference to the Kth profile 712 in FIG. 7, the value for parameter 1 may be set to value 726, the value for parameter 2 may be set to value 728, and the value for parameter N may be set to value 730. As further shown in FIG. 7, the base station 604 may set the index values (e.g., the UAI profile index 702) of the first, second, and Kth profiles 708, 710, and 712 to 1, 2, and K, respectively. For example, if there are a total of three profiles (e.g., K=3), the base station 604 may set the index value of the Kth profile 712 (e.g., the third profile in this example) to 3. In some examples, the set of values 714, 716, and 718, the set of values 720, 722, 724, and the set of values 726, 728, 730 may each represent a unique combination of parameter values.

In the aspects described herein, a value (e.g., value 714, 716, 718, 720, 722, 724, 726, 728, 730) of a parameter may be a decimal value, a binary value, a hexadecimal value, and/or other suitable value. In some examples, a value of a parameter may be expressed in the form of a bit string, one or more octets, or any other form appropriate for the parameter.

In another example, the base station 604 may generate multiple profiles by selecting different subsets of the set of parameters for the profiles. For example, FIG. 8 illustrates a diagram 800 including one or more profiles based on the set of parameters and a different index value associated with each profile in accordance with various aspects of the present disclosure. With reference to the UE assistance information parameters 804 in FIG. 8, for example, the base station 604 may select a first subset of parameters (e.g., parameters 1 through 7) and may generate a first profile 818. The base station 604 may select a second subset of parameters (e.g., parameters 8, 9, 10) and may generate a second profile 810. The base station 604 may select a third subset of parameters (e.g., parameters 11 through 23) and may generate a third profile 812. It should be noted that the first profile 808, second profile 810, and the third profile 812 may each include different parameters. In some examples, the base station 604 may configure the parameters in each profile (e.g., the first profile 808, second profile 810, and the third profile 812) with a unique combination of values.

In some examples, the parameters 1 to 23 in FIG. 8 may respectively represent the parameters 512 to 566 in FIG. 5, such that the first profile 808 includes the operation complexity control parameters 504, the second profile 810 includes the network coverage control parameters 506, and the third profile 812 includes the channel monitoring control parameters 508.

It should be understood that, in other examples, the base station 604 may generate a different number of profiles than those shown in FIG. 8. It should also be understood that, in other examples, the base station 604 may generate profiles including a different number of parameters than those shown in FIG. 8.

For example, with reference to the first profile 808 and the parameter values 806 in FIG. 8, the values for parameters 1, 2, 3, 4, 5, 6, 7 may be set to values 814, 816, 818, 820, 822, 824, 826, respectively. With reference to the second profile 810 in FIG. 8, the values for parameters 8, 9, and 10 may be set to values 828, 830, and 832, respectively. With reference to the third profile 812 in FIG. 8, the values for parameters 11 through 23 may be respectively set to values 834, 836, 838, 840, 842, 844, 846, 848, 850, 852, 854, 856, 858. As further shown in FIG. 8, the base station 604 may set the index values (e.g., the UAI profile index 802) of the first, second, and third profiles 808, 810, and 812 to 1, 2, and 3, respectively.

In some aspects of the disclosure, a profile may include a number of parameters (and their corresponding preconfigured values) associated with a common feature or objective of the UE 602 (e.g., parameters that may impact power savings, parameters that may increase or decrease operation complexity, parameters that may increase or decrease network coverage, etc.). In one implementation, the first and second profiles 708, 710 may include parameters that may impact power savings. Accordingly, with reference to FIG. 7, the parameters 1 through N in the first and second profiles 708, 710 may include some of the channel monitoring control parameters 508 shown in FIG. 5. For purposes of illustration, the channel monitoring control parameters 508 may be associated with monitoring PDDCH, where parameter 1 in the first and second profiles 708, 710 may be for setting a preferred number of CORESETS per BWP, parameter 2 in the first and second profiles 708, 710 may be for setting a preferred number of PDDCH blind decodes per slot, and parameter N in the first and second profiles 708, 710 may be for setting a preferred number of PDDCH CCEs per slot. In this example, the parameter values for the first profile 708 (e.g., the values 714, 716, 718) may be configured to enable the UE 602 to monitor PDCCH more frequently to achieve low scheduling latency as compared to the parameter values for the second profile 710 (e.g., the values 720, 722, 724).

Therefore, continuing with the previous example, the first profile 708 may set the parameter for a preferred number of CORESETs per BWP (e.g., parameter 1) to a parameter value (e.g., value 714) that allows the UE 602 to have a higher number of CORESETs per BWP as compared to the second profile 710 (e.g., value 714 may be greater than value 720). The first profile 708 may set the parameter for a preferred number of PDCCH blind decodes per slot (e.g., parameter 2) to a parameter value (e.g., value 716) that allows the UE 602 to have more blind decodes per slot as compared to the second profile 710 (e.g., value 716 may be greater than value 722). The first profile 708 may set the parameter for a preferred number of PDDCH CCEs per slot (e.g., parameter N) to a parameter value (e.g., value 718) that allows the UE 602 to have more CCEs per slot as compared to the second profile 710 (e.g., value 718 may be greater than value 724). Since the first profile 708 may cause the UE 602 to monitor PDDCH more frequently relative to the second profile 710, the first profile 708 may cause the UE 602 to consume more power. Accordingly, in this example, the UE 602 may select the first profile 708 when the UE 602 is plugged in to a power source and may select the second profile 710 when the UE 602 is no longer plugged in to a power source to improve battery performance.

In the aspects described herein, it should be noted that different profiles may include a different set of parameters based on a common feature or objective of a UE. In some examples, different profiles may include the same set of parameters, but a different combination of values. In other examples, different profiles may include different sets of parameters. In some aspects of the disclosure, the first profile 708, the second profile 710, and the Kth profile 712 may each include a different number of parameters. In some aspects of the disclosure, the base station 604 may enable profile based signaling of parameter values to exercise control over the number and/or types of parameters the UE 602 may indicate in a UE assistance information message.

Referring back to FIG. 6, the base station 604 may transmit a message 610 including the configuration information for a UE assistance information message. In some aspects of the disclosure, the message 610 may be a dedicated radio resource control (RRC) message.

In some aspects of the disclosure, at 612, the UE 602 may optionally detect a change in traffic (e.g., data traffic) or a change in the power state of the UE 602. For example, the UE 602 may detect that an amount of data being received at or transmitted from the UE 602 at a given time changes to a value below a threshold value or changes to a value above the threshold value. As another example, at 612, the UE 602 may optionally detect that a power state of the UE 602 changes from a battery powered mode to a plugged-in mode (or a battery charging mode), or changes from the plugged-in mode (or a battery charging mode) to the battery powered mode.

As shown in FIG. 6, at 614, the UE 602 may generate a UE assistance information message based on the configuration information for a UE assistance information message included in the message 610. In some aspects of the disclosure, the UE 602 may generate the UE assistance information message based on at least a portion of the set of parameters (e.g., the example set of UE assistance information parameters 502 shown in FIG. 5). In some aspects of the disclosure, if profile based signaling is enabled by the network (e.g., the base station 604), the UE 602 may generate the UE assistance information message by selecting one of the profiles indicated in the configuration information for the UE assistance information message based on a performance objective of the UE 602. The UE 602 may determine an index value of the selected profile and may include the index value in the UE assistance information message.

In some aspects of the disclosure, the UE 602 may include a request to add a new parameter to at least one of the existing profiles (e.g., at least one of the profiles 708, 710, 712, 808, 810, 812) in the UE assistance information message or may include a request to add a new profile in the UE assistance information message. For example, the new parameter may be a parameter included in the example set of UE assistance information parameters 502 shown in FIG. 5 or may be a different parameter. For example, the new profile may be based on the example set of UE assistance information parameters 502 shown in FIG. 5 (e.g., the new profile may be a subset of the set of UE assistance information parameters 502) and/or different parameters. In some examples, the UE 602 may provide preferred values for one or more of the parameters in the new profile.

In some aspects of the disclosure, the UE 602 may include a request to change a value of at least one parameter of an existing profile in the UE assistance information message. In some aspects of the disclosure, the UE 602 may include a request to set a value for a parameter in the set of parameters in the UE assistance information message, where the value serves as a request (also referred to as an implicit request) for an activation or deactivation of a feature of the UE. In some examples, the feature may be a control channel monitoring operation or an uplink transmission on one or more carriers. In some aspects of the disclosure, the value serving as a request for an activation or deactivation of a feature of the UE may be a preconfigured special value.

For example, if the UE 602 prefers to deactivate monitoring of the PDCCH, the UE 602 may request to set the value of the parameter 546 for a preferred number of CORESETs per BWP to zero. In other words, the UE 602 may request zero CORESETs for a current active BWP of the UE 602. As another example, if the UE 602 prefers to deactivate monitoring of the PDCCH, the UE 602 may request to set the value of the parameter 564 for a preferred minimum periodicity for all common search spaces to infinity to disable PDCCH monitoring in the serving cell (e.g., in the cell being served by the base station 604).

In some aspects of the disclosure, the UE 602 may set the parameter 532 for a coverage level (e.g., a number of repetitions) for transmission of UL signals on a per frequency range basis. Therefore, in some examples, if the UE 602 prefers to deactivate an uplink transmission on one or more carriers, the UE 602 may request to set the parameter 532 for a coverage level (e.g., a number of repetitions) for transmission of UL signals to zero to implicitly request the network (e.g., the base station 604) to disable uplink transmissions on carriers within a frequency range. For example, the frequency range may be one of a first frequency range, such as Frequency Range 1 (FR1), or a second frequency range, such as Frequency Range 2 (FR2). For example, FR1 may include sub-6 GHz frequency bands within the range 450 MHz to 6 GHz, and FR2 may include frequency bands with the range 24.25 GHz to 52.6 GHz (e.g., also referred to as the millimeter wave (mmWave) range). In one example scenario, if the UE 602 prefers to deactivate uplink transmissions on FR2 when coverage becomes weak (e.g., below a threshold), the UE 602 may request to set the parameter 532 for a coverage level for transmission of UL signals on FR2 to zero.

As shown in FIG. 6, the UE 602 may transmit the UE assistance information message 616 (also referred to as an enhanced UE assistance information message) including preferred values for one or more RRC parameters. As further shown in FIG. 6, at 618, the base station may generate a radio resource control (RRC) reconfiguration message (e.g., the RRC reconfiguration message 620) based on the received UE assistance information message 616. In some aspects of the disclosure, the radio resource control (RRC) reconfiguration message may be configured to adjust or override the parameters (also referred to as RRC parameters) of the UE 602 based on the parameter values indicated in the UE assistance information message 616. For example, the radio resource control (RRC) reconfiguration message may configure one or more RRC parameters of the UE 602 based on the requested parameter values in the UE assistance information message 616. In some examples, the radio resource control (RRC) reconfiguration message may configure one or more RRC parameters of the UE 602 with values that are different from the requested parameter values in the UE assistance information message 616. As shown in FIG. 6, the base station 604 may transmit the RRC reconfiguration message 620 to the UE 602.

In some aspects of the disclosure, the UE 602 may transmit a UE assistance information message (e.g., the UE assistance information message 616) that includes a preferred value for each one of the parameters indicated in the set of parameters (e.g., the example set of UE assistance information parameters 502 shown in FIG. 5). For example, the UE 602 may transmit a UE assistance information message including a preferred value for the parameter 512 for indicating a preferred number of activated transmission configuration indicator (TCI) states for PDCCH and PDSCH, a preferred value for the parameter 514 for indicating a preferred scheduling offset granularity, and so on, up to and including a preferred value for parameter 566 for indicating a preferred minimum periodicity for all UE-specific search spaces.

In some scenarios, a UE assistance information message that includes a preferred value for each one of the parameters indicated in the set of parameters as previously described may create a high signaling overhead. The UE 602 may avoid such high signaling overhead by implementing the profile based signaling described herein. For example, since the parameters included in each profile have correlated parameter values, the UE 602 may request a preconfigured combination of values for a preconfigured subset of parameters by indicating an index value (also referred to as an index) of a selected profile.

In some aspects of the disclosure, the base station 604 may indicate to the UE 602 whether the UE 602 is to exclusively use UE assistance information messages that include preferred values for one or more parameters indicated in the set of parameters, whether the UE 602 is to exclusively use the UE assistance information messages that implement the profile based signaling described herein, or whether the UE 602 may use both UE assistance information messages that include preferred values for one or more parameters indicated in the set of parameters and UE assistance information messages that implement the profile based signaling.

As shown in FIG. 6, at 622, the UE 602 may optionally perform one or more operations based on the RRC reconfiguration message 620. For example, the UE 602 may monitor a control channel (e.g., PDCCH) more frequently or less frequently based on RRC reconfiguration information included in the RRC reconfiguration message 620.

Figure 9:
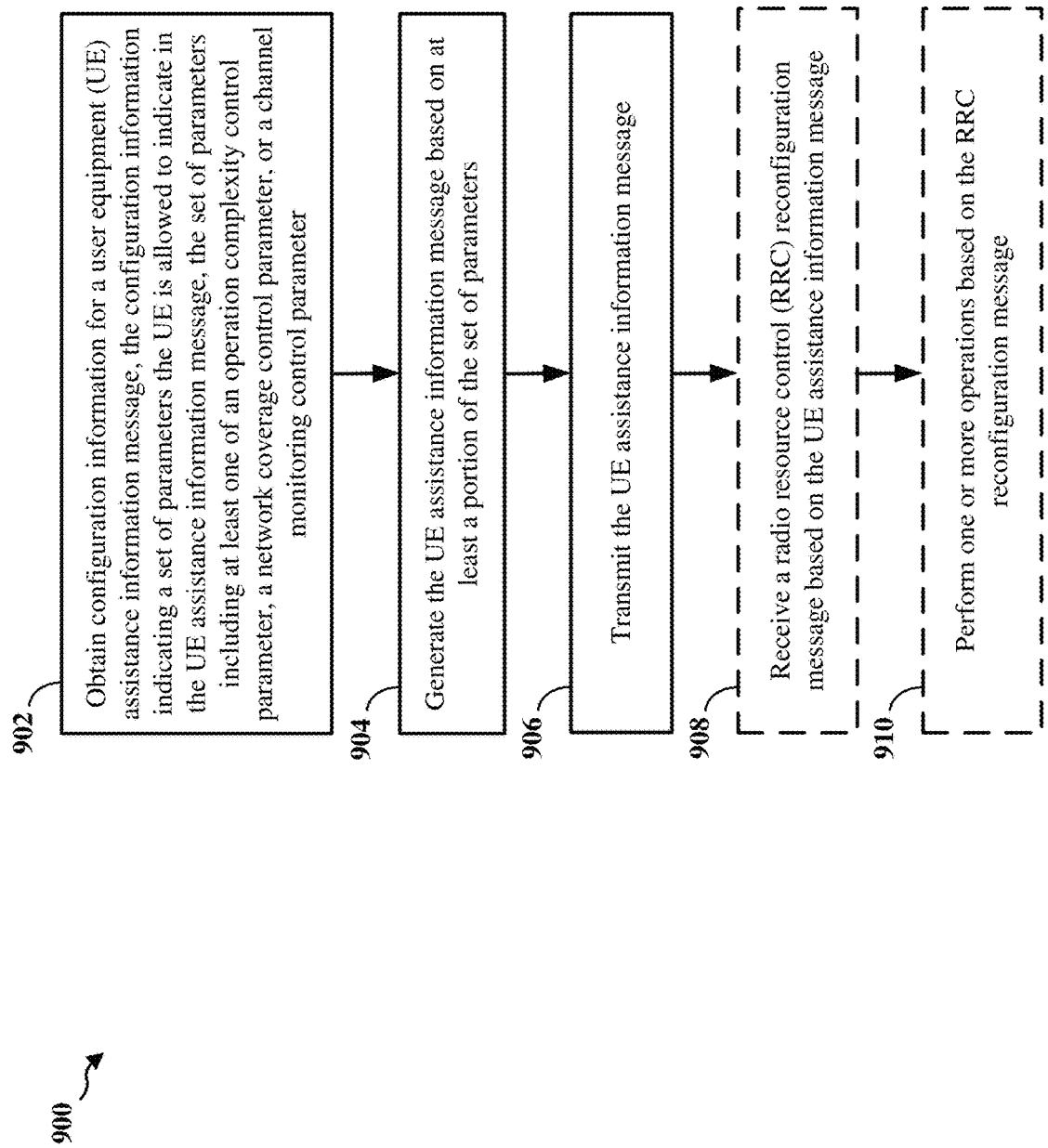
FIG. 9 is a flowchart of a method of wireless communication.

FIG. 9 is a flowchart 900 of a method of wireless communication. The method may be performed by a UE (e.g., the UE 104, 602; the apparatus 1102/1102'; the processing system 1214, which may include the memory 360 and which may be the entire UE 104, 602 or a component of the UE 104, 602, such as the TX processor 368, the RX processor 356, and/or the controller/processor 359). It should be understood that operations indicated with dashed lines in FIG. 9 (e.g., operations 908, 910) represent optional operations.

At 902, the UE obtains configuration information for a user equipment (UE) assistance information message (also referred to as an enhanced user equipment (UE) assistance information message, an enhanced UAI message, or a UAI message). For example, with reference to FIG. 6, the UE 602 may obtain the configuration information for the UE assistance information message by receiving the configuration information for the UE assistance information (e.g., in the message 610) from the base station 604.

The configuration information for the UE assistance information message may indicate a set of parameters (e.g., the example set of UE assistance information parameters 502 in FIG. 5) the UE is allowed to indicate in the UE assistance information message (e.g., the UE assistance information message 616 in FIG. 6). The set of parameters may include at least one of an operation complexity control parameter (e.g., a parameter included in the operation complexity control parameters 504 in FIG. 5), a network coverage control parameter (e.g., a parameter included in the network coverage control parameters 506 in FIG. 5), or a channel monitoring control parameter (e.g., a parameter included in the channel monitoring control parameters 508 in FIG. 5).

In some aspects of the disclosure, the operation complexity control parameter may be a parameter for indicating a number of activated TCI states for a downlink control channel and a downlink shared channel, a parameter for indicating a scheduling offset granularity, a parameter for indicating a concurrent scheduling configuration, a parameter for indicating a half-duplex slot format, a parameter for indicating a BWP index, a parameter for enabling or disabling a use of positioning information for beam management or interference management. In some aspects of the disclosure, the operation complexity control parameter may be a parameter for enabling or disabling a use of mobility information or speed information for at least one of a handover operation, a closed-loop timing control operation, a power control operation, a resource allocation, a physical layer measurement, or a radio resource control layer measurement.

In some aspects of the disclosure, the network coverage control parameter may be a parameter for indicating a coverage level for at least one of a downlink signal or an uplink signal, a parameter for indicating a coverage enhancement scheme, or a parameter for indicating a loss of antenna efficiency resulting from a reduced form factor of the UE.

In some aspects of the disclosure, the channel monitoring control parameter may be a parameter for indicating an aggregation level for the UE to process, a parameter for indicating a maximum number of RB segments for a CORESET and for overlapping CORESETs, a parameter for indicating a number of CORESETs for a BWP, a parameter for indicating a number of DCI sizes for a slot and across slots, a parameter for indicating a preferred number of DCI formats configured for each of a search space set, a parameter for indicating a number of buffered downlink DCI messages and/or uplink DCI messages, or a parameter for indicating a minimum application delay in a symbol or a slot for a SFI downlink control channel. In some aspects of the disclosure, the channel monitoring control parameter may be a parameter for indicating a number of blind decodes in a slot for a control channel, a parameter for indicating a number of CCEs for each slot of a control channel, a parameter for indicating a number of common search spaces for a bandwidth part (BWP), a parameter for indicating a preferred number of search spaces associated with the UE for the BWP, a parameter for indicating a minimum periodicity for common search spaces, and a parameter for indicating a minimum periodicity for the search spaces associated with the UE.

In some aspects of the present disclosure, the configuration information further indicates a plurality of profiles (e.g., the first, second and Kth profiles 708, 710, 712 in FIG. 7 and/or the first, second and third profiles 808, 810, 812 in FIG. 8) based on the set of parameters. In these aspects, each of the plurality of profiles may be associated with a different index value. In some aspects of the present disclosure, at least two of the plurality of profiles (e.g., the first, second and Kth profiles 708, 710, 712) includes a subset of the set of parameters (e.g., parameters 1 to N in the first, second and Kth profiles 708, 710, 712) and a unique combination of values for the subset of the set of parameters. In some aspects of the disclosure, with reference to FIG. 8, the plurality of profiles (e.g., the first, second and third profiles 808, 810, 812 in FIG. 8) contains at least a first profile including a first subset of the set of parameters (e.g., parameters 1 to 7) and a first set of values (e.g., values 814 to 826) for the first subset of the set of parameters, and a second profile including a second subset of the set of parameters (e.g., parameters 8 to 10) and a second set of values (e.g., values 828 to 832) for the second subset of the set of parameters.

At 904, the UE generates the UE assistance information message based on at least a portion of the set of parameters. For example, with reference to the diagram 500 in FIG. 5, the set of parameters may include one or more of the parameters 512 through 566. In this example, the UE may include a preferred value for one or more of the parameters 512 through 566 in the UE assistance information message.

In some aspects of the present disclosure, the UE generates the UE assistance information message by selecting a profile among the plurality of profiles based on a performance objective of the UE, determining an index value of the selected profile, and including the index value in the UE assistance information message.

For example, with reference to the channel monitoring control parameters 508 in FIG. 5 and the first and second profiles 708, 710 in FIG. 7, parameter 1 in the first and second profiles 708, 710 may be for setting a preferred number of CORESETS per BWP, parameter 2 in the first and second profiles 708, 710 may be for setting a preferred number of PDDCH blind decodes per slot, and parameter N in the first and second profiles 708, 710 may be for setting a preferred number of PDDCH CCEs per slot. In this example, the parameter values for the first profile 708 (e.g., the values 714, 716, 718) may be configured to enable the UE 602 to monitor PDCCH more frequently to achieve low scheduling latency as compared to the parameter values for the second profile 710 (e.g., the values 720, 722, 724).

Therefore, the first profile 708 may set the parameter for a preferred number of CORESETs per BWP (e.g., parameter 1 in the first profile 708) to a parameter value (e.g., value 714) that allows the UE to have a higher number of CORESETs per BWP as compared to the second profile 710 (e.g., value 714 may be greater than value 720). The first profile 708 may set the parameter for a preferred number of PDCCH blind decodes per slot (e.g., parameter 2 in the first profile 708) to a parameter value (e.g., value 716) that allows the UE 602 to have more blind decodes per slot as compared to the second profile 710 (e.g., value 716 may be greater than value 722). The first profile 708 may set the parameter for a preferred number of PDDCH CCEs per slot (e.g., parameter N in the first profile 708) to a parameter value (e.g., value 718) that allows the UE 602 to have more CCEs per slot as compared to the second profile 710 (e.g., value 718 may be greater than value 724).

Since the first profile 708 may cause the UE to monitor PDDCH more frequently relative to the second profile 710, the first profile 708 may cause the UE to consume more power. Accordingly, in this example, the UE may select the first profile 708 when the UE is plugged in to a power source and may select the second profile 710 when the UE is no longer plugged in to a power source to improve battery performance. The UE may then determine the index value of the selected profile (e.g., index value 1 if the first profile 708 is selected or index value 2 if the second profile 710 is selected) and may include the index value in the UE assistance information message.

In some aspects of the present disclosure, when generating the UE assistance information message, the UE includes a request to add a new parameter to at least one of the plurality of profiles or to add a new profile to the plurality of profiles in the UE assistance information message. In some aspects of the present disclosure, when generating the UE assistance information message, the UE includes a request to change a value of at least one parameter of a profile in the plurality of profiles in the UE assistance information message. In some aspects of the present disclosure, when generating the UE assistance information message, the UE includes a request to set a value for a parameter in the set of parameters in the UE assistance information message, wherein the value serves as a request for an activation or deactivation of a feature of the UE. In some aspects of the disclosure, the feature is a control channel monitoring operation or an uplink transmission on one or more carriers.

At 906, the UE transmits the UE assistance information message. For example, with reference to FIG. 6, the UE 602 may transmit the UE assistance information message 616 to the base station 604.

At 908, the UE receives a radio resource control (RRC) reconfiguration message based on the UE assistance information message. For example, with reference to FIG. 6, the UE 602 may receive the RRC reconfiguration message 620 (e.g., from the base station 604) based on the UE assistance information message 616.

Finally at 910, the UE performs one or more operations based on the RRC reconfiguration message. In one example scenario, if the first profile 708 may cause the UE to monitor PDDCH more frequently relative to the second profile 710, and the UE selected the first profile 708 (e.g., the UE included the index value 1 corresponding to the first profile 708 in the UE assistance information message to the base station), the RRC reconfiguration information included in the RRC reconfiguration message may cause the UE to monitor PDCCH more frequently. In another example scenario, if the UE selected the second profile 710 (e.g., the UE included the index value 2 corresponding to the second profile 710 in the UE assistance information message to the base station), the RRC reconfiguration information included in the RRC reconfiguration message may cause the UE to monitor PDCCH less frequently.

Figure 10:
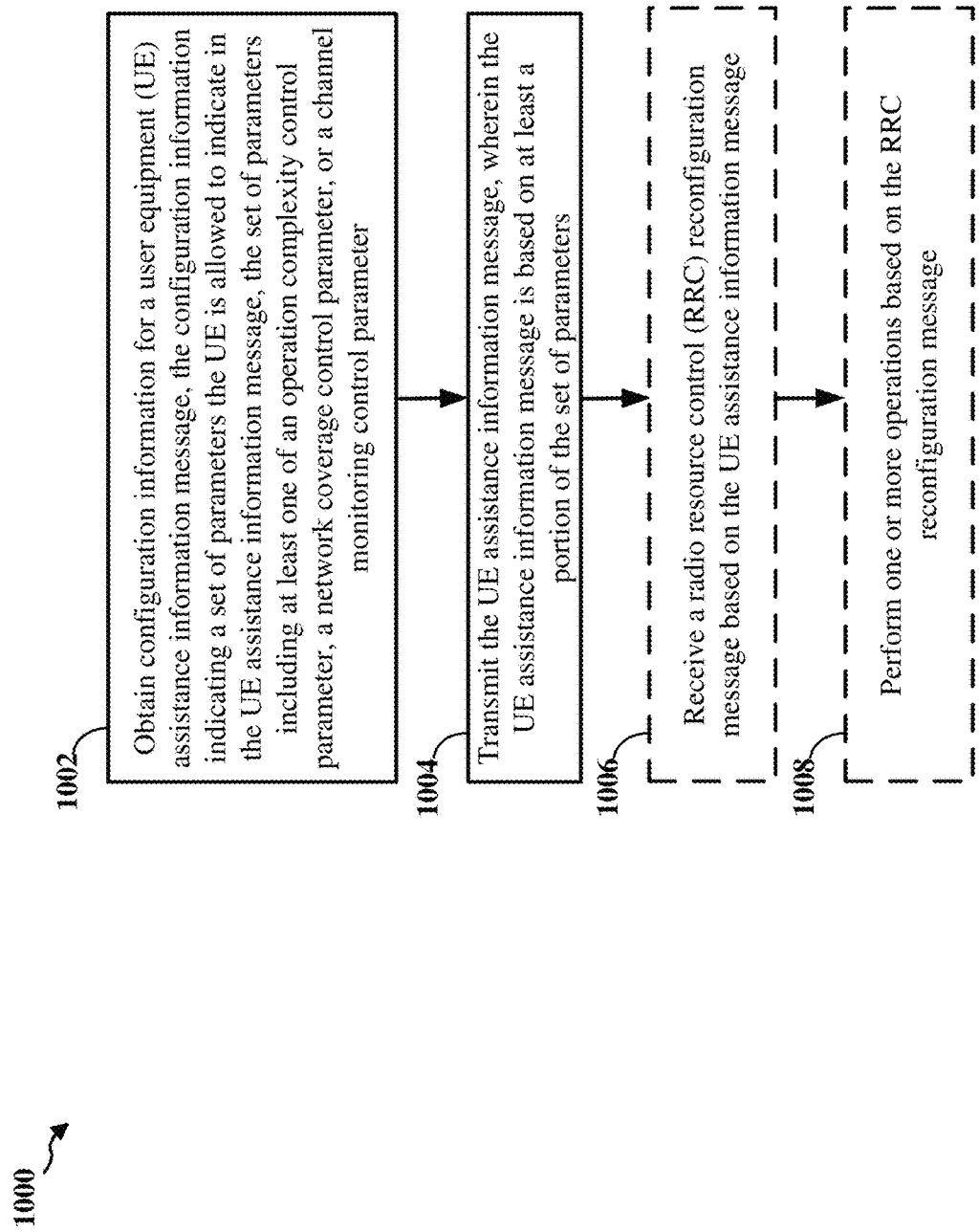
FIG. 10 is a flowchart of a method of wireless communication.

FIG. 10 is a flowchart 1000 of a method of wireless communication. The method may be performed by a UE (e.g., the UE 104, 602; the apparatus 1102/1102'; the processing system 1214, which may include the memory 360 and which may be the entire UE 104, 602 or a component of the UE 104, 602, such as the TX processor 368, the RX processor 356, and/or the controller/processor 359). It should be understood that operations indicated with dashed lines in FIG. 10 (e.g., operations 1006 and 1008) represent optional operations.

At 1002, the UE obtains configuration information for a user equipment (UE) assistance information message (also referred to as an enhanced UE assistance information message, an enhanced UAI message, or a UAI message). For example, with reference to FIG. 6, the UE 602 may obtain the configuration information for the UE assistance information message by receiving the configuration information for the UE assistance information (e.g., in the message 610) from the base station 604.

The configuration information for the UE assistance information message may indicate a set of parameters (e.g., the example set of UE assistance information parameters 502 in FIG. 5) the UE is allowed to indicate in the UE assistance information message (e.g., the UE assistance information message 616 in FIG. 6). The set of parameters may include at least one of an operation complexity control parameter (e.g., a parameter included in the operation complexity control parameters 504 in FIG. 5), a network coverage control parameter (e.g., a parameter included in the network coverage control parameters 506 in FIG. 5), or a channel monitoring control parameter (e.g., a parameter included in the channel monitoring control parameters 508 in FIG. 5).

In some aspects of the disclosure, the operation complexity control parameter may be a parameter for indicating a number of activated TCI states for a downlink control channel and a downlink shared channel, a parameter for indicating a scheduling offset granularity, a parameter for indicating a concurrent scheduling configuration, a parameter for indicating a half-duplex slot format, a parameter for indicating a BWP index, a parameter for enabling or disabling a use of positioning information for beam management or interference management. In some aspects of the disclosure, the operation complexity control parameter may be a parameter for enabling or disabling a use of mobility information or speed information for at least one of a handover operation, a closed-loop timing control operation, a power control operation, a resource allocation, a physical layer measurement, or a radio resource control layer measurement.

In some aspects of the disclosure, the network coverage control parameter may be a parameter for indicating a coverage level for at least one of a downlink signal or an uplink signal, a parameter for indicating a coverage enhancement scheme, or a parameter for indicating a loss of antenna efficiency resulting from a reduced form factor of the UE.

In some aspects of the disclosure, the channel monitoring control parameter may be a parameter for indicating an aggregation level for the UE to process, a parameter for indicating a maximum number of RB segments for a CORESET and for overlapping CORESETs, a parameter for indicating a number of CORESETs for a BWP, a parameter for indicating a number of DCI sizes for a slot and across slots, a parameter for indicating a preferred number of DCI formats configured for each of a search space set, a parameter for indicating a number of buffered downlink DCI messages and/or uplink DCI messages, or a parameter for indicating a minimum application delay in a symbol or a slot for a SFI downlink control channel. In some aspects of the disclosure, the channel monitoring control parameter may be a parameter for indicating a number of blind decodes in a slot for a control channel, a parameter for indicating a number of CCEs for each slot of a control channel, a parameter for indicating a number of common search spaces for a bandwidth part (BWP), a parameter for indicating a preferred number of search spaces associated with the UE for the BWP, a parameter for indicating a minimum periodicity for common search spaces, and a parameter for indicating a minimum periodicity for the search spaces associated with the UE.

In some aspects of the present disclosure, the configuration information further indicates a plurality of profiles (e.g., the first, second and Kth profiles 708, 710, 712 in FIG. 7 and/or the first, second and third profiles 808, 810, 812 in FIG. 8) based on the set of parameters. In these aspects, each of the plurality of profiles may be associated with a different index value. In some aspects of the present disclosure, at least two of the plurality of profiles (e.g., the first, second and Kth profiles 708, 710, 712) includes a subset of the set of parameters (e.g., parameters 1 to N in the first, second and Kth profiles 708, 710, 712) and a unique combination of values for the subset of the set of parameters. In some aspects of the disclosure, with reference to FIG. 8, the plurality of profiles (e.g., the first, second and third profiles 808, 810, 812 in FIG. 8) contains at least a first profile including a first subset of the set of parameters (e.g., parameters 1 to 7) and a first set of values (e.g., values 814 to 826) for the first subset of the set of parameters, and a second profile including a second subset of the set of parameters (e.g., parameters 8 to 10) and a second set of values (e.g., values 828 to 832) for the second subset of the set of parameters.

At 1004, the UE transmits the UE assistance information message (e.g., the UE assistance information message 616 in FIG. 6), wherein the UE assistance information message is based on at least a portion of the set of parameters. For example, with reference to the diagram 500 in FIG. 5, the set of parameters may include one or more of the parameters 512 through 566. In this example, the UE may include a preferred value for one or more of the parameters 512 through 566 in the UE assistance information message.

In some aspects of the disclosure, the UE assistance information message includes an index value of one of the plurality of profiles based on a performance objective of the UE. For example, with reference to the channel monitoring control parameters 508 in FIG. 5 and the first and second profiles 708, 710 in FIG. 7, parameter 1 in the first and second profiles 708, 710 may be for setting a preferred number of CORESETS per BWP, parameter 2 in the first and second profiles 708, 710 may be for setting a preferred number of PDDCH blind decodes per slot, and parameter N in the first and second profiles 708, 710 may be for setting a preferred number of PDDCH CCEs per slot. In this example, the parameter values for the first profile 708 (e.g., the values 714, 716, 718) may be configured to enable the UE to monitor PDCCH more frequently to achieve low scheduling latency as compared to the parameter values for the second profile 710 (e.g., the values 720, 722, 724).

Therefore, the first profile 708 may set the parameter for a preferred number of CORESETs per BWP (e.g., parameter 1 in the first profile 708) to a parameter value (e.g., value 714) that allows the UE to have a higher number of CORESETs per BWP as compared to the second profile 710 (e.g., value 714 may be greater than value 720). The first profile 708 may set the parameter for a preferred number of PDCCH blind decodes per slot (e.g., parameter 2 in the first profile 708) to a parameter value (e.g., value 716) that allows the UE to have more blind decodes per slot as compared to the second profile 710 (e.g., value 716 may be greater than value 722). The first profile 708 may set the parameter for a preferred number of PDDCH CCEs per slot (e.g., parameter N in the first profile 708) to a parameter value (e.g., value 718) that allows the UE to have more CCEs per slot as compared to the second profile 710 (e.g., value 718 may be greater than value 724).

Since the first profile 708 may cause the UE to monitor PDDCH more frequently relative to the second profile 710, the first profile 708 may cause the UE to consume more power. Accordingly, in one example scenario, the UE may include the index value 1 corresponding to the first profile 708 in the UE assistance information message when the UE is plugged in to a power source. In another example scenario, the UE may include the index value 2 corresponding to the second profile 710 in the UE assistance information message when the UE is no longer plugged in to a power source to improve battery performance.

In some aspects of the disclosure, the UE assistance information message includes a request to add a new parameter to at least one of the plurality of profiles or to add a new profile to the plurality of profiles. In some aspects of the disclosure, the UE assistance information message includes a request to change a value of at least one parameter of a profile in the plurality of profiles. In some aspects of the disclosure, the UE assistance information message includes a request to set a value for a parameter in the set of parameters, wherein the value serves as a request for an activation or deactivation of a feature of the UE.

At 1006, the UE receives a radio resource control (RRC) reconfiguration message based on the UE assistance information message. For example, with reference to FIG. 6, the UE 602 may receive the RRC reconfiguration message 620 (e.g., from the base station 604) based on the UE assistance information message 616.

Finally at 1008, the UE performs one or more operations based on the RRC reconfiguration message. In one example scenario, if the first profile 708 may cause the UE to monitor PDDCH more frequently relative to the second profile 710, and the UE selected the first profile 708 (e.g., the UE included the index value 1 corresponding to the first profile 708 in the UE assistance information message to the base station), the RRC reconfiguration information included in the RRC reconfiguration message may cause the UE to monitor PDCCH more frequently. In another example scenario, if the UE selected the second profile 710 (e.g., the UE included the index value 2 corresponding to the second profile 710 in the UE assistance information message to the base station), the RRC reconfiguration information included in the RRC reconfiguration message may cause the UE to monitor PDCCH less frequently.

Figure 11:
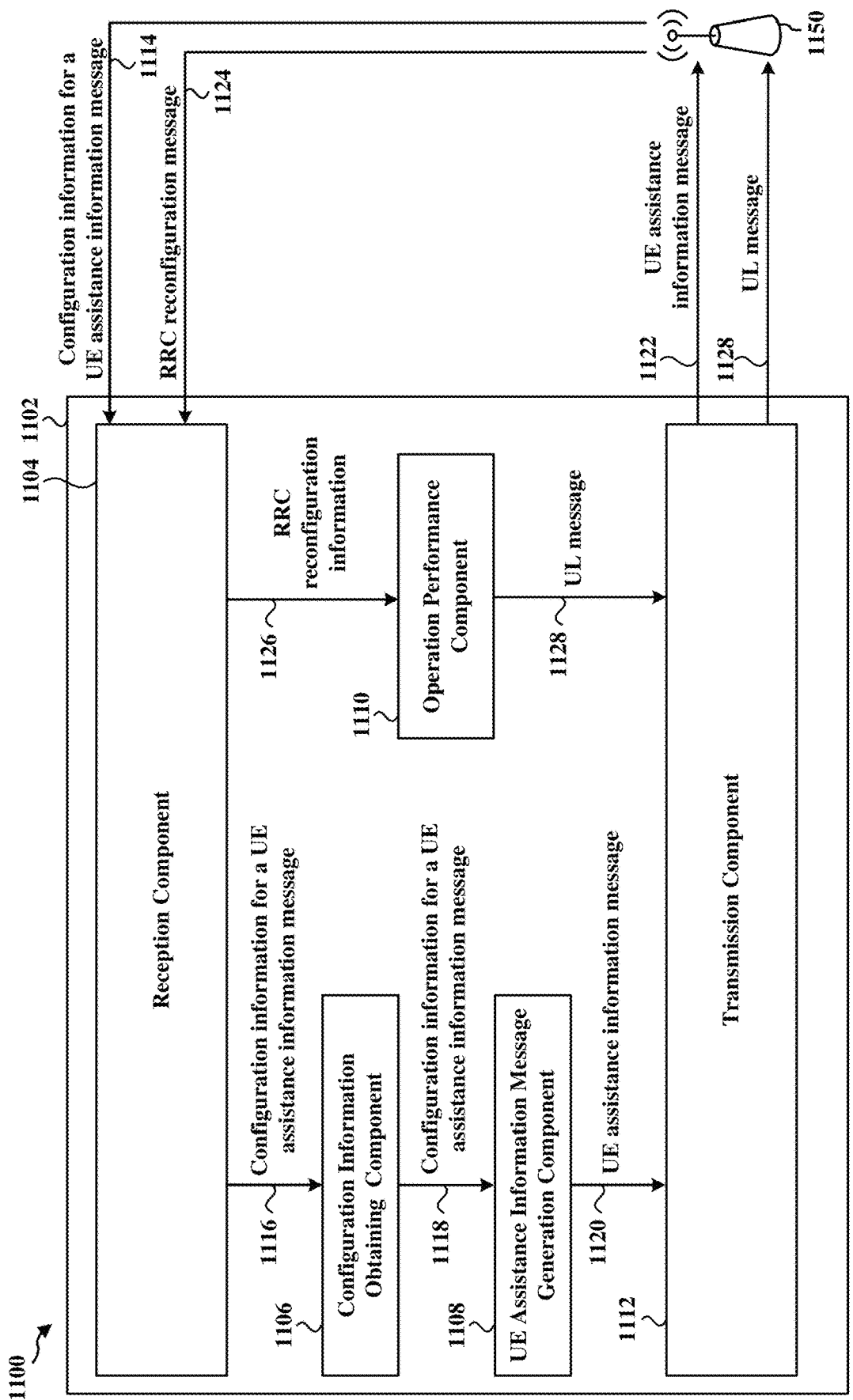
FIG. 11 is a conceptual data flow diagram illustrating the data flow between different means/components in an example apparatus.

FIG. 11 is a conceptual data flow diagram 1100 illustrating the data flow between different means/components in an example apparatus 1102. The apparatus may be a UE.

The apparatus includes a reception component 1104 that receives downlink signals from the base station 1150. In some aspects of the disclosure, the downlink signals may include configuration information 1114 for a UE assistance information message and the radio resource control (RRC) reconfiguration message 1124 shown in FIG. 11. The RRC reconfiguration message may be based on the UE assistance information message 1122.

The apparatus further includes a configuration information obtaining component 1106 that obtains configuration information for a user equipment (UE) assistance information message. In some examples, the configuration information obtaining component 1106 obtains the configuration information 1114 for a UE assistance information message via a message 1116 from the reception component 1104. In other examples, the configuration information obtaining component 1106 may obtain configuration information for the UE assistance information message from a local or external memory device that is preconfigured with the configuration information. The configuration information for the UE assistance information message indicates a set of parameters the apparatus is allowed to indicate in the UE assistance information message. The set of parameters includes at least one of an operation complexity control parameter, a network coverage control parameter, or a channel monitoring control parameter.

The apparatus further includes a UE assistance information message generation component 1108 that generates the UE assistance information message based on at least a portion of the set of parameters. As shown in FIG. 11, the UE assistance information message generation component 1108 may receive a message 1118 including the configuration information for a UE assistance information message from the configuration information obtaining component 1106, where the configuration information in the message 1118 indicates the set of parameters the apparatus is allowed to indicate in the UE assistance information message. The UE assistance information message generation component 1108 may provide the UE assistance information message to the transmission component 1112 via the message 1120 for transmission to the base station 1150. For example, the base station 1150 may transmit a message 1122 that includes the UE assistance information message.

The apparatus further includes an operation performance component 1110 that performs one or more operations based on the RRC reconfiguration information 1126. In some examples, the operation performance component 1110 may receive the RRC reconfiguration information 1126 from the reception component 1104. In these examples, the RRC reconfiguration information 1126 may be included in the RRC reconfiguration message 1124. In some examples, the operation performance component 1110 may provide at least one uplink (UL) message 1128 to the transmission component 1112 for transmission to the base station 1122.

The apparatus further includes a transmission component 1112 that transmits the UE assistance information message 1122 and the at least one uplink (UL) message 1128.

The apparatus may include additional components that perform each of the blocks of the algorithm in the aforementioned flowchart of FIGS. 9 and 10. As such, each block in the aforementioned flowchart of FIGS. 9 and 10 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 12:
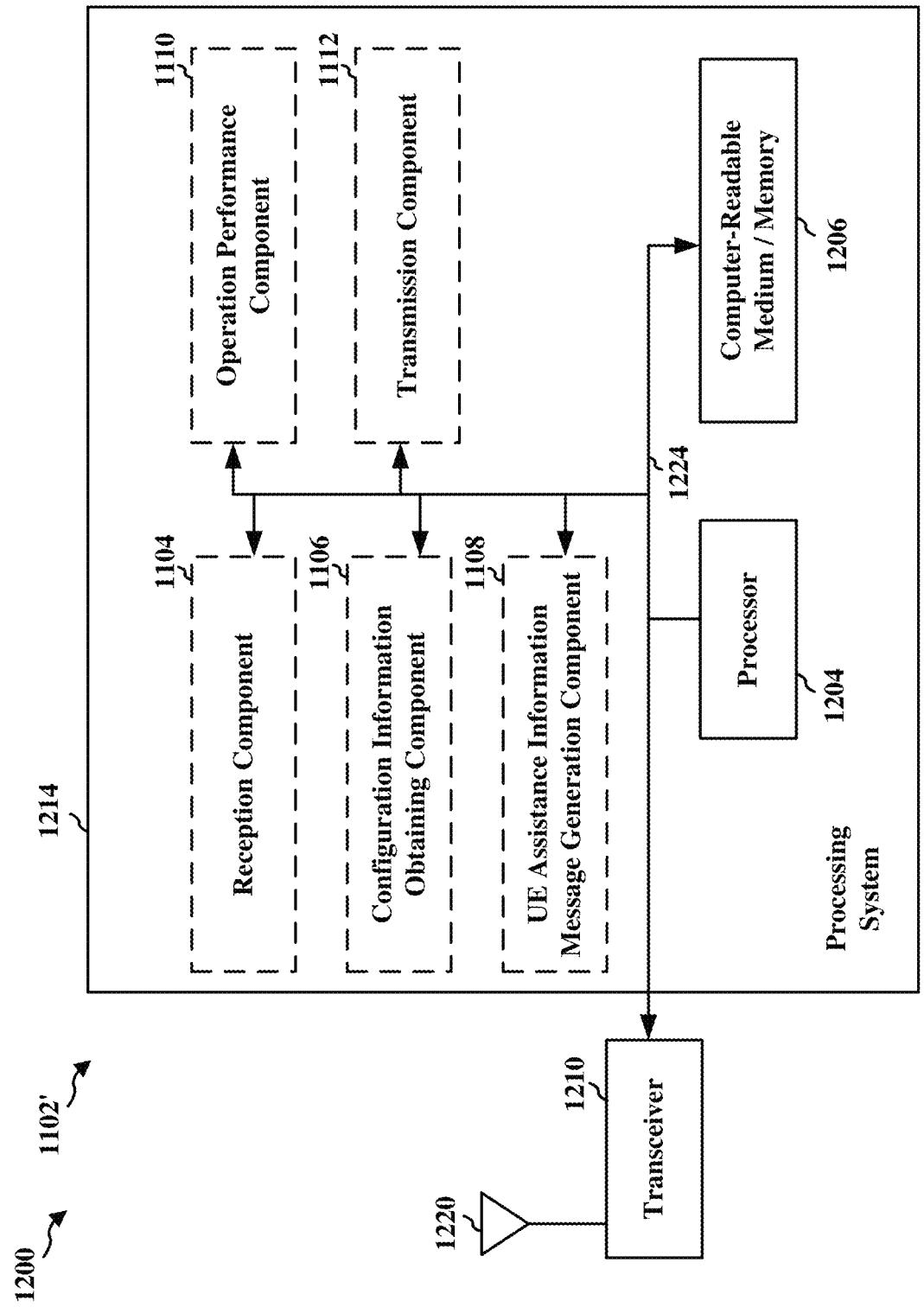
FIG. 12 is a diagram illustrating an example of a hardware implementation for an apparatus employing a processing system.

FIG. 12 is a diagram 1200 illustrating an example of a hardware implementation for an apparatus 1102' employing a processing system 1214. The processing system 1214 may be implemented with a bus architecture, represented generally by the bus 1224. The bus 1224 may include any number of interconnecting buses and bridges depending on the specific application of the processing system 1214 and the overall design constraints. The bus 1224 links together various circuits including one or more processors and/or hardware components, represented by the processor 1204, the components 1104, 1106, 1108, 1110, 1112 and the computer-readable medium/memory 1206. The bus 1224 may also link various other circuits such as timing sources, peripherals, voltage regulators, and power management circuits, which are well known in the art, and therefore, will not be described any further.

The processing system 1214 may be coupled to a transceiver 1210. The transceiver 1210 is coupled to one or more antennas 1220. The transceiver 1210 provides a means for communicating with various other apparatus over a transmission medium. The transceiver 1210 receives a signal from the one or more antennas 1220, extracts information from the received signal, and provides the extracted information to the processing system 1214, specifically the reception component 1104. In addition, the transceiver 1210 receives information from the processing system 1214, specifically the transmission component 1112, and based on the received information, generates a signal to be applied to the one or more antennas 1220. The processing system 1214 includes a processor 1204 coupled to a computer-readable medium/memory 1206. The processor 1204 is responsible for general processing, including the execution of software stored on the computer-readable medium/memory 1206. The software, when executed by the processor 1204, causes the processing system 1214 to perform the various functions described supra for any particular apparatus. The computer-readable medium/memory 1206 may also be used for storing data that is manipulated by the processor 1204 when executing software. The processing system 1214 further includes at least one of the components 1104, 1106, 1108, 1110, 1112. The components may be software components running in the processor 1204, resident/stored in the computer readable medium/memory 1206, one or more hardware components coupled to the processor 1204, or some combination thereof. The processing system 1214 may be a component of the UE 350 and may include the memory 360 and/or at least one of the TX processor 368, the RX processor 356, and the controller/processor 359. Alternatively, the processing system 1214 may be the entire UE (e.g., see 350 of FIG. 3).

In one configuration, the apparatus 1102/1102' for wireless communication includes means for obtaining configuration information for a UE assistance information message, the configuration information indicating a set of parameters the apparatus is allowed to indicate in the UE assistance information message, the set of parameters including at least one of an operation complexity control parameter, a network coverage control parameter, or a channel monitoring control parameter, means for generating the UE assistance information message based on at least a portion of the set of parameters, means for transmitting the UE assistance information message, means for receiving, from a base station, a radio resource control (RRC) reconfiguration message based on the UE assistance information message, means for performing one or more operations based on the RRC reconfiguration message. The aforementioned means may be one or more of the aforementioned components of the apparatus 1102 and/or the processing system 1214 of the apparatus 1102' configured to perform the functions recited by the aforementioned means. As described supra, the processing system 1214 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 13:
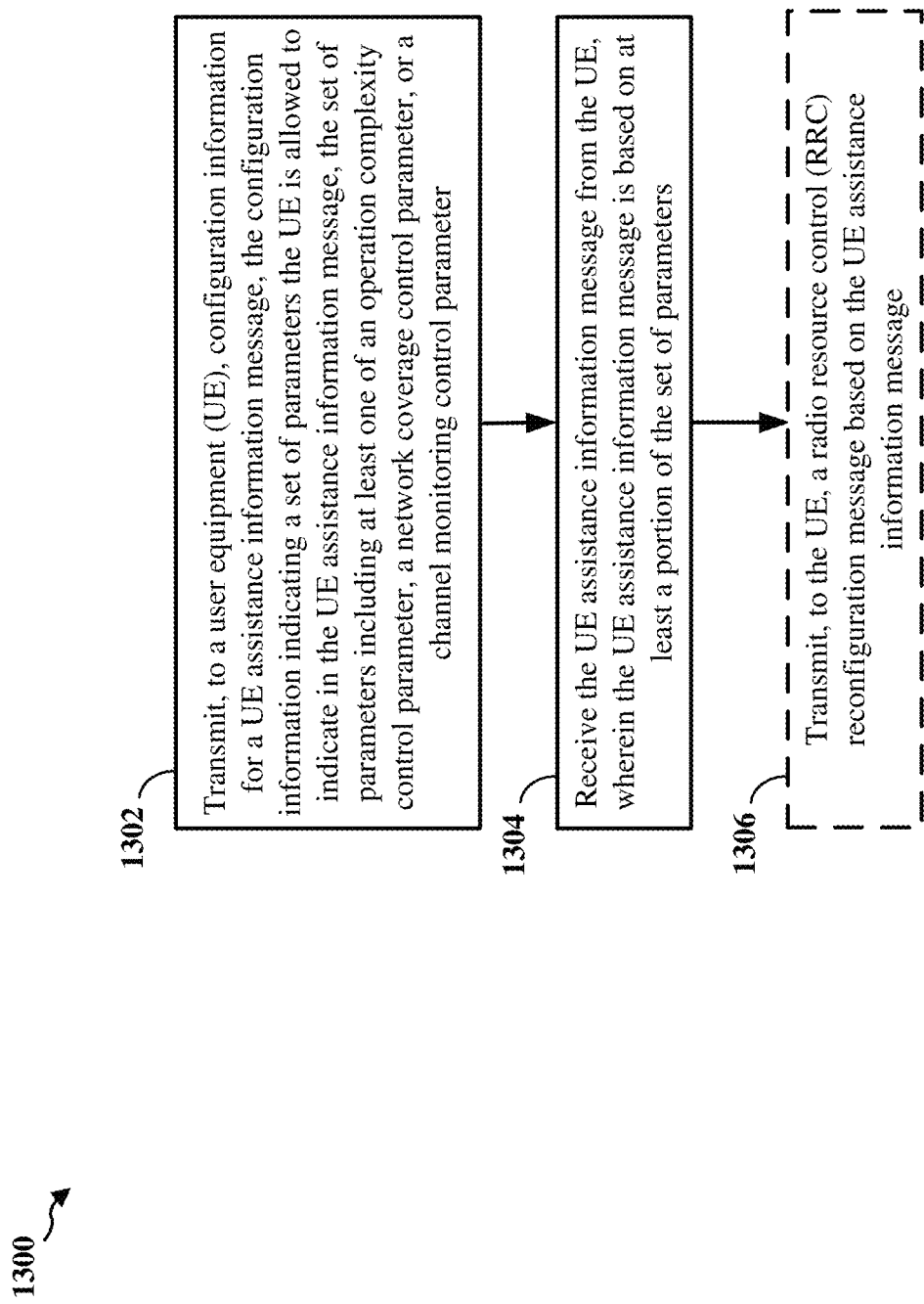
FIG. 13 is a flowchart of a method of wireless communication.

FIG. 13 is a flowchart 1300 of a method of wireless communication. The method may be performed by a base station (e.g., the base station 102, 604; the apparatus 1402/1402'; the processing system 1514, which may include the memory 376 and which may be the entire base station 102, 604 or a component of the base station 102, 604, such as the TX processor 316, the RX processor 370, and/or the controller/processor 375). It should be understood that operations indicated with dashed lines in FIG. 13 (e.g., operation 1306) represent optional operations.

At 1302, the base station transmits, to a UE, configuration information for a UE assistance information message, the configuration information indicating a set of parameters the UE is allowed to indicate in the UE assistance information message, the set of parameters including at least one of an operation complexity control parameter, a network coverage control parameter, or a channel monitoring control parameter. For example, with reference to FIG. 6, the base station 604 may transmit the message 610 including the configuration information for a UE assistance information message. In some aspects of the disclosure, the message 610 may be a dedicated radio resource control (RRC) message.

The configuration information for the UE assistance information message may indicate a set of parameters (e.g., the example set of UE assistance information parameters 502 in FIG. 5) the UE is allowed to indicate in the UE assistance information message (e.g., the UE assistance information message 616 in FIG. 6). The set of parameters may include at least one of an operation complexity control parameter (e.g., a parameter included in the operation complexity control parameters 504 in FIG. 5), a network coverage control parameter (e.g., a parameter included in the network coverage control parameters 506 in FIG. 5), or a channel monitoring control parameter (e.g., a parameter included in the channel monitoring control parameters 508 in FIG. 5).

In some aspects of the disclosure, the operation complexity control parameter may be a parameter for indicating a number of activated TCI states for a downlink control channel and a downlink shared channel, a parameter for indicating a scheduling offset granularity, a parameter for indicating a concurrent scheduling configuration, a parameter for indicating a half-duplex slot format, a parameter for indicating a BWP index, a parameter for enabling or disabling a use of positioning information for beam management or interference management. In some aspects of the disclosure, the operation complexity control parameter may be a parameter for enabling or disabling a use of mobility information or speed information for at least one of a handover operation, a closed-loop timing control operation, a power control operation, a resource allocation, a physical layer measurement, or a radio resource control layer measurement.

In some aspects of the disclosure, the network coverage control parameter may be a parameter for indicating a coverage level for at least one of a downlink signal or an uplink signal, a parameter for indicating a coverage enhancement scheme, or a parameter for indicating a loss of antenna efficiency resulting from a reduced form factor of the UE.

In some aspects of the disclosure, the channel monitoring control parameter may be a parameter for indicating an aggregation level for the UE to process, a parameter for indicating a maximum number of RB segments for a CORESET and for overlapping CORESETs, a parameter for indicating a number of CORESETs for a BWP, a parameter for indicating a number of DCI sizes for a slot and across slots, a parameter for indicating a preferred number of DCI formats configured for each of a search space set, a parameter for indicating a number of buffered downlink DCI messages and/or uplink DCI messages, or a parameter for indicating a minimum application delay in a symbol or a slot for a SFI downlink control channel. In some aspects of the disclosure, the channel monitoring control parameter may be a parameter for indicating a number of blind decodes in a slot for a control channel, a parameter for indicating a number of CCEs for each slot of a control channel, a parameter for indicating a number of common search spaces for a bandwidth part (BWP), a parameter for indicating a preferred number of search spaces associated with the UE for the BWP, a parameter for indicating a minimum periodicity for common search spaces, and a parameter for indicating a minimum periodicity for the search spaces associated with the UE.

In some aspects of the present disclosure, the configuration information further indicates a plurality of profiles (e.g., the first, second and Kth profiles 708, 710, 712 in FIG. 7 and/or the first, second and third profiles 808, 810, 812 in FIG. 8) based on the set of parameters. In these aspects, each of the plurality of profiles may be associated with a different index value. In some aspects of the present disclosure, at least two of the plurality of profiles (e.g., the first, second and Kth profiles 708, 710, 712) includes a subset of the set of parameters (e.g., parameters 1 to N in the first, second and Kth profiles 708, 710, 712) and a unique combination of values for the subset of the set of parameters. In some aspects of the disclosure, with reference to FIG. 8, the plurality of profiles (e.g., the first, second and third profiles 808, 810, 812 in FIG. 8) contains at least a first profile including a first subset of the set of parameters (e.g., parameters 1 to 7) and a first set of values (e.g., values 814 to 826) for the first subset of the set of parameters, and a second profile including a second subset of the set of parameters (e.g., parameters 8 to 10) and a second set of values (e.g., values 828 to 832) for the second subset of the set of parameters.

At 1304, the base station receives the UE assistance information message from the UE. The UE assistance information message is based on at least a portion of the set of parameters. For example, with reference to the diagram 500 in FIG. 5, the set of parameters may include one or more of the parameters 512 through 566. In this example, the UE may include a preferred value for one or more of the parameters 512 through 566 in the UE assistance information message.

In some aspects of the disclosure, the UE assistance information message includes an index value of one of the plurality of profiles based on a performance objective of the UE. For example, with reference to the channel monitoring control parameters 508 in FIG. 5 and the first and second profiles 708, 710 in FIG. 7, parameter 1 in the first and second profiles 708, 710 may be for setting a preferred number of CORESETS per BWP, parameter 2 in the first and second profiles 708, 710 may be for setting a preferred number of PDDCH blind decodes per slot, and parameter N in the first and second profiles 708, 710 may be for setting a preferred number of PDDCH CCEs per slot. In this example, the parameter values for the first profile 708 (e.g., the values 714, 716, 718) may be configured to enable the UE to monitor PDCCH more frequently to achieve low scheduling latency as compared to the parameter values for the second profile 710 (e.g., the values 720, 722, 724).

Therefore, the first profile 708 may set the parameter for a preferred number of CORESETs per BWP (e.g., parameter 1 in the first profile 708) to a parameter value (e.g., value 714) that allows the UE to have a higher number of CORESETs per BWP as compared to the second profile 710 (e.g., value 714 may be greater than value 720). The first profile 708 may set the parameter for a preferred number of PDCCH blind decodes per slot (e.g., parameter 2 in the first profile 708) to a parameter value (e.g., value 716) that allows the UE to have more blind decodes per slot as compared to the second profile 710 (e.g., value 716 may be greater than value 722). The first profile 708 may set the parameter for a preferred number of PDDCH CCEs per slot (e.g., parameter N in the first profile 708) to a parameter value (e.g., value 718) that allows the UE to have more CCEs per slot as compared to the second profile 710 (e.g., value 718 may be greater than value 724).

Since the first profile 708 may cause the UE to monitor PDDCH more frequently relative to the second profile 710, the first profile 708 may cause the UE to consume more power. Accordingly, in one example scenario, the UE may include the index value 1 corresponding to the first profile 708 in the UE assistance information message when the UE is plugged in to a power source. In another example scenario, the UE may include the index value 2 corresponding to the second profile 710 in the UE assistance information message when the UE is no longer plugged in to a power source to improve battery performance.

In some aspects of the disclosure, the UE assistance information message includes a request to add a new parameter to at least one of the plurality of profiles or to add a new profile to the plurality of profiles. In some aspects of the disclosure, the UE assistance information message includes a request to change a value of at least one parameter of a profile in the plurality of profiles. In some aspects of the disclosure, the UE assistance information message includes a request to set a value for a parameter in the set of parameters, wherein the value serves as a request for an activation or deactivation of a feature of the UE.

Finally, at 1306, the base station transmits, to the UE, a radio resource control (RRC) reconfiguration message based on the UE assistance information message. For example, with reference to FIG. 6, the base station 604 may transmit the RRC reconfiguration message 620 based on the UE assistance information message 616. In some aspects of the disclosure, the RRC reconfiguration message may be configured to adjust or override the parameters (also referred to as RRC parameters) of the UE based on the parameter values indicated in the UE assistance information message. For example, the RRC reconfiguration message may configure one or more RRC parameters of the UE based on the requested parameter values in the UE assistance information message. In some examples, the RRC reconfiguration message may configure one or more RRC parameters of the UE with values that are different from the requested parameter values in the UE assistance information message.

Figure 14:
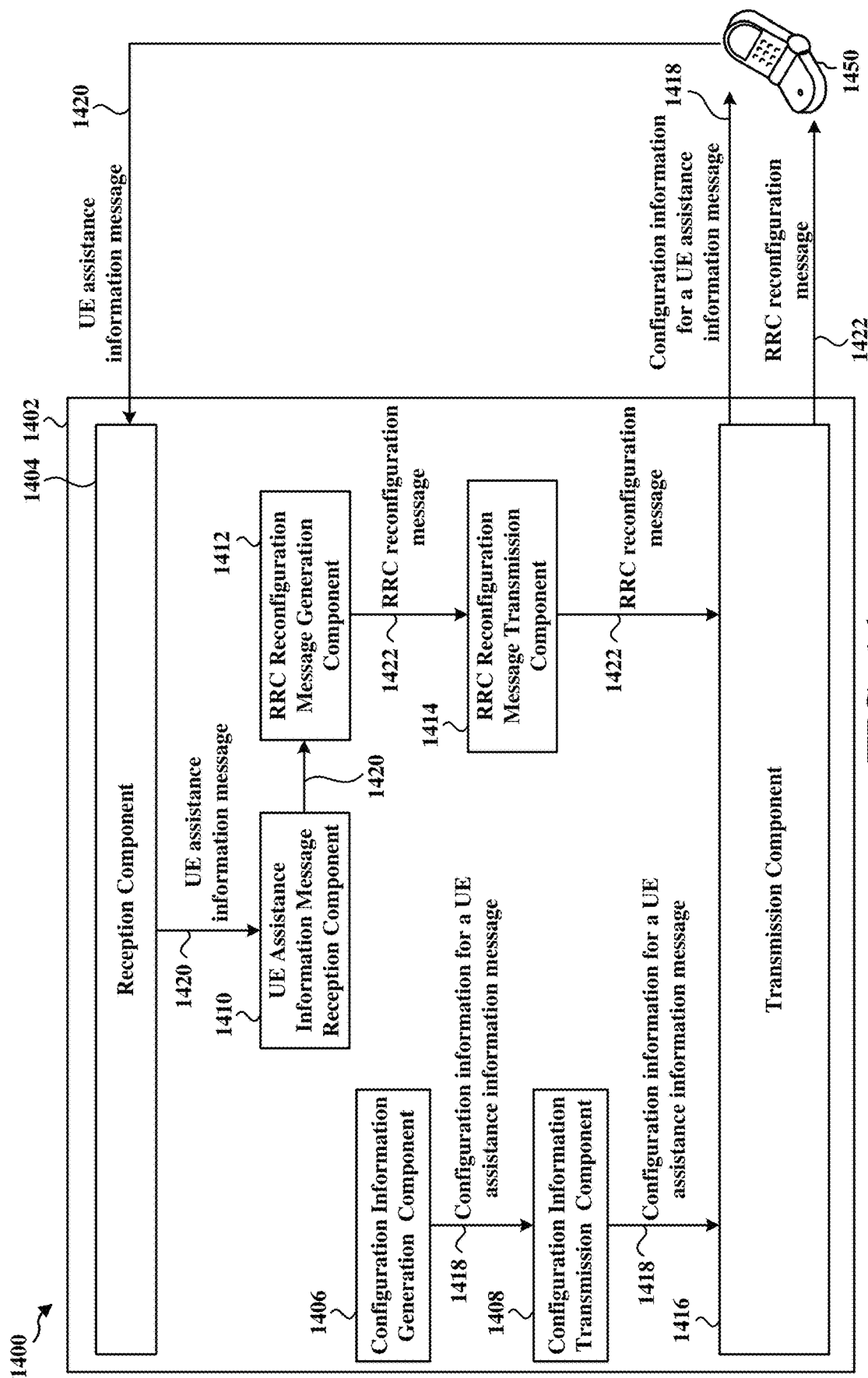
FIG. 14 is a conceptual data flow diagram illustrating the data flow between different means/components in an example apparatus.

FIG. 14 is a conceptual data flow diagram 1400 illustrating the data flow between different means/components in an example apparatus 1402. The apparatus may be a base station.

The apparatus includes a reception component 1404 that receives uplink signals from a UE (e.g., the UE 1450). In some examples, the uplink signals may include a UE assistance information message 1420.

The apparatus further includes a configuration information generation component 1406 that generates configuration information 1418 for a UE assistance information message. The configuration information 1418 for a UE assistance information message indicates a set of parameters the UE 1450 is allowed to indicate in a UE assistance information message (e.g., the UE assistance information message 1420). The set of parameters includes at least one of an operation complexity control parameter, a network coverage control parameter, or a channel monitoring control parameter. In some aspects of the disclosure, the configuration information 1418 for a UE assistance information message may include a structure of an information element (IE) that the UE 1450 may use to indicate parameters in the UE assistance information message 1420.

The apparatus further includes a configuration information transmission component 1408 that transmits (e.g., via the transmission component 1416) the configuration information 1418 for a UE assistance information message. The configuration information transmission component 1408 may receive the configuration information 1418 for a UE assistance information message from the configuration information generation component 1406.

The apparatus further includes a UE assistance information message reception component 1410 that receives a UE assistance information message (e.g., the UE assistance information message 1420) from the UE 1450. The UE assistance information message 1420 is based on at least a portion of the set of parameters.

The apparatus further includes an RRC reconfiguration message generation component 1412. The RRC reconfiguration message generation component 1412 may generate an RRC reconfiguration message 1422 based on the UE assistance information message 1420 received from the UE assistance information message reception component 1410.

The apparatus further includes an RRC reconfiguration message transmission component 1414 that transmits (e.g., via the transmission component 1416) the RRC reconfiguration message 1422.

The apparatus further includes a transmission component 1416 that transmits downlink signals to a UE (e.g., UE 1450). In some examples, the downlink signals may include the configuration information 1418 for a UE assistance information message and/or the RRC reconfiguration message 1422. The RRC reconfiguration message 1422 may be based on the UE assistance information message 1420.

The apparatus may include additional components that perform each of the blocks of the algorithm in the aforementioned flowcharts of FIG. 13. As such, each block in the aforementioned flowcharts of FIG. 13 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 15:
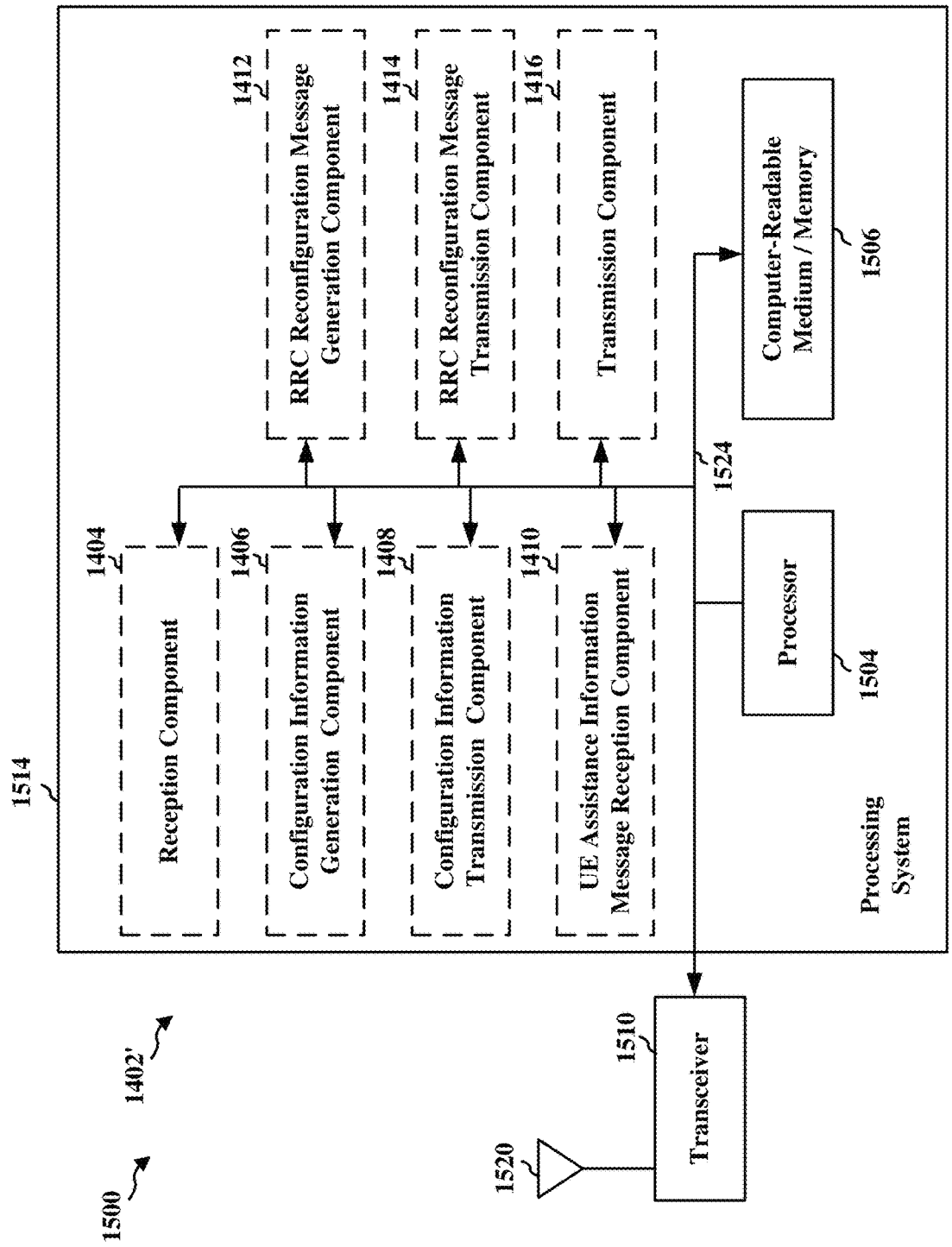
FIG. 15 is a diagram illustrating an example of a hardware implementation for an apparatus employing a processing system.

FIG. 15 is a diagram 1500 illustrating an example of a hardware implementation for an apparatus 1402' employing a processing system 1514. The processing system 1514 may be implemented with a bus architecture, represented generally by the bus 1524. The bus 1524 may include any number of interconnecting buses and bridges depending on the specific application of the processing system 1514 and the overall design constraints. The bus 1524 links together various circuits including one or more processors and/or hardware components, represented by the processor 1504, the components 1404, 1406, 1408, 1410, 1412, 1414, 1416 and the computer-readable medium/memory 1506. The bus 1524 may also link various other circuits such as timing sources, peripherals, voltage regulators, and power management circuits, which are well known in the art, and therefore, will not be described any further.

The processing system 1514 may be coupled to a transceiver 1510. The transceiver 1510 is coupled to one or more antennas 1520. The transceiver 1510 provides a means for communicating with various other apparatus over a transmission medium. The transceiver 1510 receives a signal from the one or more antennas 1520, extracts information from the received signal, and provides the extracted information to the processing system 1514, specifically the reception component 1404. In addition, the transceiver 1510 receives information from the processing system 1514, specifically the transmission component 1416, and based on the received information, generates a signal to be applied to the one or more antennas 1520. The processing system 1514 includes a processor 1504 coupled to a computer-readable medium/memory 1506. The processor 1504 is responsible for general processing, including the execution of software stored on the computer-readable medium/memory 1506. The software, when executed by the processor 1504, causes the processing system 1514 to perform the various functions described supra for any particular apparatus. The computer-readable medium/memory 1506 may also be used for storing data that is manipulated by the processor 1504 when executing software. The processing system 1514 further includes at least one of the components 1404, 1406, 1408, 1410, 1412, 1414, 1416. The components may be software components running in the processor 1504, resident/stored in the computer readable medium/memory 1506, one or more hardware components coupled to the processor 1504, or some combination thereof. The processing system 1514 may be a component of the base station 310 and may include the memory 376 and/or at least one of the TX processor 316, the RX processor 370, and the controller/processor 375. Alternatively, the processing system 1514 may be the entire base station (e.g., see 310 of FIG. 3).

In one configuration, the apparatus 1402/1402' for wireless communication includes means for transmitting, to a UE, configuration information for a UE assistance information message, the configuration information indicating a set of parameters the UE is allowed to indicate in the UE assistance information message, the set of parameters including at least one of an operation complexity control parameter, a network coverage control parameter, or a channel monitoring control parameter, means for receiving the UE assistance information message from the UE, wherein the UE assistance information message is based on at least a portion of the set of parameters, and means for transmitting, to the UE, a radio resource control (RRC) reconfiguration message based on the UE assistance information message. The aforementioned means may be one or more of the aforementioned components of the apparatus 1402 and/or the processing system 1514 of the apparatus 1402' configured to perform the functions recited by the aforementioned means. As described supra, the processing system 1514 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

Therefore, the described aspects may expand the existing parameters (e.g., RRC parameters) that a UE may request to change via a UE assistance information message to include new categories of parameters, such as the operation complexity control parameters, network coverage control parameters, and/or channel monitoring control parameters described in detail herein. For example, these new categories of parameters may improve the performance of different types of UEs (e.g., UEs with reduced capabilities, premium smartphones, etc.) by allowing each UE to change parameters associated with its processing capabilities and/or power saving objectives.

The aspects described herein may reduce the signaling overhead of a UE assistance information message. For example, when the profile based signaling described herein is enabled by the network (e.g., the base station 604), a UE (e.g., the UE 602) may transmit a UE assistance information message that includes an index value of one of the profiles indicated to the UE (e.g., the first profile 708, the second profile 710, or the Kth profile 712 as described with reference to FIG. 7) based on a performance objective of the UE. This may allow a UE to avoid requesting a parameter value individually for each parameter in a UE assistance information message, thereby reducing the signaling overhead of the UE assistance information message.

The following provides an overview of aspects of the present disclosure:

Aspect 1: A method of wireless communication for a user equipment (UE), comprising: obtaining configuration information for a user equipment (UE) assistance information message, the configuration information indicating a set of parameters the apparatus is allowed to indicate in the UE assistance information message, the set of parameters including at least one of an operation complexity control parameter, a network coverage control parameter, or a channel monitoring control parameter; and transmitting the UE assistance information message, wherein the UE assistance information message is based on at least a portion of the set of parameters.

Aspect 2: The method of aspect 1, further comprising: receiving, from a base station, a radio resource control (RRC) reconfiguration message based on the UE assistance information message; and performing one or more operations based on the RRC reconfiguration message.

Aspect 3: The method of aspect 1 or 2, wherein the configuration information further indicates a plurality of profiles based on the set of parameters, and wherein each of the plurality of profiles is associated with a different index value.

Aspect 4: The method of aspect 3, wherein at least two of the plurality of profiles includes a subset of the set of parameters and a unique combination of values for the subset of the set of parameters.

Aspect 5: The method of aspect 3 or 4, wherein the plurality of profiles contains at least a first profile including a first subset of the set of parameters and a first set of values for the first subset of the set of parameters; and a second profile including a second subset of the set of parameters and a second set of values for the second subset of the set of parameters.

Aspect 6: The method of any of aspects 3 through 5, wherein the UE assistance information message includes an index value of one of the plurality of profiles based on a performance objective of the UE.

Aspect 7: The method of any of aspects 3 through 6, wherein the UE assistance information message includes a request to add a new parameter to at least one of the plurality of profiles or to add a new profile to the plurality of profiles.

Aspect 8: The method of any of aspects 3 through 7, wherein the UE assistance information message includes a request to change a value of at least one parameter of a profile in the plurality of profiles.

Aspect 9: The method of any of aspects 1 through 3, wherein the UE assistance information message includes a request to set a value for a parameter in the set of parameters, wherein the value serves as a request for an activation or deactivation of a feature of the UE.

Aspect 10: The method of aspect 9, wherein the feature is a control channel monitoring operation or an uplink transmission on one or more carriers.

Aspect 11: The method of any of aspects 1 through 10, wherein the operation complexity control parameter is a parameter for indicating a number of activated transmission configuration indicator (TCI) states for a downlink control channel and a downlink shared channel, a parameter for indicating a scheduling offset granularity, a parameter for indicating a concurrent scheduling configuration, a parameter for indicating a half-duplex slot format, a parameter for indicating a bandwidth part (BWP) index, a parameter for enabling or disabling a use of positioning information for beam management or interference management.

Aspect 12: The method of any of aspects 1 through 10, wherein the operation complexity control parameter is a parameter for enabling or disabling a use of mobility information or speed information for at least one of a handover operation, a closed-loop timing control operation, a power control operation, a resource allocation, a physical layer measurement, or a radio resource control layer measurement.

Aspect 13: The method of any of aspects 1 through 12, wherein the network coverage control parameter is a parameter for indicating a coverage level for at least one of a downlink signal or an uplink signal, a parameter for indicating a coverage enhancement scheme, or a parameter for indicating a loss of antenna efficiency resulting from a reduced form factor of the UE.

Aspect 14: The method of any of aspects 1 through 13, wherein the channel monitoring control parameter is a parameter for indicating an aggregation level for the UE to process, a parameter for indicating a maximum number of resource block (RB) segments for a control resource set (CORESET) and for overlapping CORESETs, a parameter for indicating a number of CORESETs for a bandwidth part (BWP), a parameter for indicating a number of downlink control information (DCI) sizes for a slot and across slots, a parameter for indicating a preferred number of downlink control information (DCI) formats configured for each of a search space set, a parameter for indicating a number of buffered downlink DCI messages and/or uplink DCI messages, or a parameter for indicating a minimum application delay in a symbol or a slot for a slot format indicator (SFI) downlink control channel.

Aspect 15: The method of any of aspects 1 through 14, wherein the channel monitoring control parameter is a parameter for indicating a number of blind decodes in a slot for a control channel, a parameter for indicating a number of control channel elements (CCEs) for each slot of a control channel, a parameter for indicating a number of common search spaces for a bandwidth part (BWP), a parameter for indicating a preferred number of search spaces associated with the UE for the bandwidth part (BWP), a parameter for indicating a minimum periodicity for common search spaces, or a parameter for indicating a minimum periodicity for the search spaces associated with the UE.

Aspect 16: An apparatus for wireless communication, comprising: a memory; and at least one processor coupled to the memory and configured to perform a method of any one of aspects 1 through 15.

Aspect 17: An apparatus for wireless communication comprising at least one means for performing a method of any one of aspects 1 through 15.

Aspect 18: A computer-readable medium storing computer executable code, the code when executed by a processor cause the processor to perform a method of any one of aspects 1 through 15.

Aspect 19: A method of wireless communication for a base station, comprising: transmitting, to a user equipment (UE), configuration information for a UE assistance information message, the configuration information indicating a set of parameters the UE is allowed to indicate in the UE assistance information message, the set of parameters including at least one of an operation complexity control parameter, a network coverage control parameter, or a channel monitoring control parameter; and receiving the UE assistance information message from the UE, wherein the UE assistance information message is based on at least a portion of the set of parameters.

Aspect 20: The method of aspect 19, further comprising: transmitting, to the UE, a radio resource control (RRC) reconfiguration message based on the UE assistance information message.

Aspect 21: The method of aspect 19 or 20, wherein the configuration information further indicates a plurality of profiles based on the set of parameters, and wherein each of the plurality of profiles is associated with a different index value.

Aspect 22: The method of aspect 21, wherein at least two of the plurality of profiles includes a subset of the set of parameters and a unique combination of values for the subset of the set of parameters.

Aspect 23: The method of aspect 21 or 22, wherein the plurality of profiles contains at least a first profile including a first subset of the set of parameters and a first set of values for the first subset of the set of parameters; and a second profile including a second subset of the set of parameters and a second set of values for the second subset of the set of parameters.

Aspect 24: The method of any of aspects 21 through 23, wherein the UE assistance information message includes an index value of one of the plurality of profiles based on a performance objective of the UE.

Aspect 25: The method of any of aspects 21 through 24, wherein the UE assistance information message includes a request to add a new parameter to at least one of the plurality of profiles or to add a new profile to the plurality of profiles.

Aspect 26: The method of any of aspects 21 through 25, wherein the UE assistance information message includes a request to change a value of at least one parameter of a profile in the plurality of profiles.

Aspect 27: The method of any of aspects 19 through 21, wherein the UE assistance information message includes a request to set a value for a parameter in the set of parameters, wherein the value serves as a request for an activation or deactivation of a feature of the UE.

Aspect 28: The method of aspect 27, wherein the feature is a control channel monitoring operation or an uplink transmission on one or more carriers.

Aspect 29: The method of any of aspects 19 through 28, wherein the operation complexity control parameter is a parameter for indicating a number of activated transmission configuration indicator (TCI) states for a downlink control channel and a downlink shared channel, a parameter for indicating a scheduling offset granularity, a parameter for indicating a concurrent scheduling configuration, a parameter for indicating a half-duplex slot format, a parameter for indicating a bandwidth part (BWP) index, a parameter for enabling or disabling a use of positioning information for beam management or interference management.

Aspect 30: The method of any of aspects 19 through 28, wherein the operation complexity control parameter is a parameter for enabling or disabling a use of mobility information or speed information for at least one of a handover operation, a closed-loop timing control operation, a power control operation, a resource allocation, a physical layer measurement, or a radio resource control layer measurement.

Aspect 31: The method of any of aspects 19 through 30, wherein the network coverage control parameter is a parameter for indicating a coverage level for at least one of a downlink signal or an uplink signal, a parameter for indicating a coverage enhancement scheme, or a parameter for indicating a loss of antenna efficiency resulting from a reduced form factor of the UE.

Aspect 32: The method of any of aspects 19 through 31, wherein the channel monitoring control parameter is a parameter for indicating an aggregation level for the UE to process, a parameter for indicating a maximum number of resource block (RB) segments for a control resource set (CORESET) and for overlapping CORESETs, a parameter for indicating a number of CORESETs for a bandwidth part (BWP), a parameter for indicating a number of downlink control information (DCI) sizes for a slot and across slots, a parameter for indicating a preferred number of downlink control information (DCI) formats configured for each of a search space set, a parameter for indicating a number of buffered downlink DCI messages and/or uplink DCI messages, or a parameter for indicating a minimum application delay in a symbol or a slot for a slot format indicator (SFI) downlink control channel.

Aspect 33: The method of any of aspects 19 through 31, wherein the channel monitoring control parameter is a parameter for indicating a number of blind decodes in a slot for a control channel, a parameter for indicating a number of control channel elements (CCEs) for each slot of a control channel, a parameter for indicating a number of common search spaces for a bandwidth part (BWP), a parameter for indicating a preferred number of search spaces associated with the UE for the bandwidth part (BWP), a parameter for indicating a minimum periodicity for common search spaces, or a parameter for indicating a minimum periodicity for the search spaces associated with the UE.

Aspect 34: An apparatus for wireless communication, comprising: a memory; and at least one processor coupled to the memory and configured to perform a method of any one of aspects 19 through 33.

Aspect 35: An apparatus for wireless communication comprising at least one means for performing a method of any one of aspects 19 through 33.

Aspect 36: A computer-readable medium storing computer executable code, the code when executed by a processor cause the processor to perform a method of any one of aspects 19 through 33.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. As used herein, the term "obtaining" may include one or more actions including, but not limited to, receiving, generating, determining, or any combination thereof. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. An apparatus for wireless communication, comprising:
a memory; and
at least one processor coupled to the memory and configured to:
obtain configuration information for a user equipment (UE) assistance information message, the configuration information indicating a set of parameters the apparatus is allowed to indicate in the UE assistance information message, the set of parameters including at least one of an operation complexity control parameter, a network coverage control parameter, or a channel monitoring control parameter;
transmit the UE assistance information message to a base station, wherein the UE assistance information message is based on at least a portion of the set of parameters;
receive, from the base station, a radio resource control (RRC) reconfiguration message based on the UE assistance information message based on at least the portion of the set of parameters; and
perform one or more operations based on the RRC reconfiguration message.

2. The apparatus of claim 1, wherein the configuration information further indicates a plurality of profiles based on the set of parameters, and wherein each of the plurality of profiles is associated with a different index value.

3. The apparatus of claim 2, wherein at least two of the plurality of profiles includes a subset of the set of parameters and a unique combination of values for the subset of the set of parameters.

4. The apparatus of claim 2, wherein the plurality of profiles contains at least
a first profile including a first subset of the set of parameters and a first set of values for the first subset of the set of parameters; and
a second profile including a second subset of the set of parameters and a second set of values for the second subset of the set of parameters.

5. The apparatus of claim 2, wherein the UE assistance information message includes an index value of one of the plurality of profiles based on a performance objective of the apparatus.

6. The apparatus of claim 2, wherein the UE assistance information message includes a request to add a new parameter to at least one of the plurality of profiles or to add a new profile to the plurality of profiles.

7. The apparatus of claim 2, wherein the UE assistance information message includes a request to change a value of at least one parameter of a profile in the plurality of profiles.

8. The apparatus of claim 1, wherein the UE assistance information message includes a request to set a value for a parameter in the set of parameters, wherein the value serves as a request for an activation or deactivation of a feature of the apparatus.

9. The apparatus of claim 8, wherein the feature is a control channel monitoring operation or an uplink transmission on one or more carriers.

10. The apparatus of claim 1, wherein the operation complexity control parameter is a parameter for indicating a number of activated transmission configuration indicator (TCI) states for a downlink control channel and a downlink shared channel, a parameter for indicating a scheduling offset granularity, a parameter for indicating a concurrent scheduling configuration, a parameter for indicating a half-duplex slot format, a parameter for indicating a bandwidth part (BWP) index, a parameter for enabling or disabling a use of positioning information for beam management or interference management.

11. The apparatus of claim 1, wherein the operation complexity control parameter is a parameter for enabling or disabling a use of mobility information or speed information for at least one of a handover operation, a closed-loop timing control operation, a power control operation, a resource allocation, a physical layer measurement, or a radio resource control layer measurement.

12. The apparatus of claim 1, wherein the network coverage control parameter is a parameter for indicating a coverage level for at least one of a downlink signal or an uplink signal, a parameter for indicating a coverage enhancement scheme, or a parameter for indicating a loss of antenna efficiency resulting from a reduced form factor of the apparatus.

13. The apparatus of claim 1, wherein the channel monitoring control parameter is a parameter for indicating an aggregation level for the apparatus to process, a parameter for indicating a maximum number of resource block (RB) segments for a control resource set (CORESET) and for overlapping CORESETs, a parameter for indicating a number of CORESETs for a bandwidth part (BWP), a parameter for indicating a number of downlink control information (DCI) sizes for a slot and across slots, a parameter for indicating a preferred number of downlink control information (DCI) formats configured for each of a search space set, a parameter for indicating a number of buffered downlink DCI messages and/or uplink DCI messages, or a parameter for indicating a minimum application delay in a symbol or a slot for a slot format indicator (SFI) downlink control channel.

14. The apparatus of claim 1, wherein the channel monitoring control parameter is a parameter for indicating a number of blind decodes in a slot for a control channel, a parameter for indicating a number of control channel elements (CCEs) for each slot of a control channel, a parameter for indicating a number of common search spaces for a bandwidth part (BWP), a parameter for indicating a preferred number of search spaces associated with the apparatus for the bandwidth part (BWP), a parameter for indicating a minimum periodicity for common search spaces, or a parameter for indicating a minimum periodicity for the search spaces associated with the apparatus.

15. A method of wireless communication for a user equipment (UE) comprising:
obtaining configuration information for a UE assistance information message, the configuration information indicating a set of parameters the UE is allowed to indicate in the UE assistance information message, the set of parameters including at least one of an operation complexity control parameter, a network coverage control parameter, or a channel monitoring control parameter;
transmitting the UE assistance information message to a base station, wherein the UE assistance information message is based on at least a portion of the set of parameters;
receiving, from the base station, a radio resource control (RRC) reconfiguration message based on the UE assistance information message; and
performing one or more operations based on the RRC reconfiguration message.

16. The method of claim 15, wherein the configuration information further indicates a plurality of profiles based on the set of parameters, and wherein each of the plurality of profiles is associated with a different index value.

17. The method of claim 16, wherein at least two of the plurality of profiles includes a subset of the set of parameters and a unique combination of values for the subset of the set of parameters.

18. The method of claim 16, wherein the plurality of profiles contains at least
a first profile including a first subset of the set of parameters and a first set of values for the first subset of the set of parameters; and
a second profile including a second subset of the set of parameters and a second set of values for the second subset of the set of parameters.

19. The method of claim 16, wherein the UE assistance information message includes an index value of one of the plurality of profiles based on a performance objective of the UE.

20. The method of claim 16, wherein the UE assistance information message includes
a request to add a new parameter to at least one of the plurality of profiles or to add a new profile to the plurality of profiles.

21. The method of claim 16, wherein the UE assistance information message includes a request to change a value of at least one parameter of a profile in the plurality of profiles.

22. The method of claim 15, wherein the operation complexity control parameter is a parameter for indicating a number of activated transmission configuration indicator (TCI) states for a downlink control channel and a downlink shared channel, a parameter for indicating a scheduling offset granularity, a parameter for indicating a concurrent scheduling configuration, a parameter for indicating a half-duplex slot format, a parameter for indicating a bandwidth part (BWP) index, a parameter for enabling or disabling a use of positioning information for beam management or interference management.

23. The method of claim 15, wherein the operation complexity control parameter is a parameter for enabling or disabling a use of mobility information or speed information for at least one of a handover operation, a closed-loop timing control operation, a power control operation, a resource allocation, a physical layer measurement, or a radio resource control layer measurement.

24. The method of claim 15, wherein the network coverage control parameter is a parameter for indicating a coverage level for at least one of a downlink signal or an uplink signal, a parameter for indicating a coverage enhancement scheme, or a parameter for indicating a loss of antenna efficiency resulting from a reduced form factor of the UE.

25. The method of claim 15, wherein the channel monitoring control parameter is a parameter for indicating an aggregation level for the UE to process, a parameter for indicating a maximum number of resource block (RB) segments for a control resource set (CORESET) and for overlapping CORESETs, a parameter for indicating a number of CORESETs for a bandwidth part (BWP), a parameter for indicating a number of downlink control information (DCI) sizes for a slot and across slots, a parameter for indicating a preferred number of downlink control information (DCI) formats configured for each of a search space set, a parameter for indicating a number of buffered downlink DCI messages and/or uplink DCI messages, or a parameter for indicating a minimum application delay in a symbol or a slot for a slot format indicator (SFI) downlink control channel.

26. The method of claim 15, wherein the channel monitoring control parameter is a parameter for indicating a number of blind decodes in a slot for a control channel, a parameter for indicating a number of control channel elements (CCEs) for each slot of a control channel, a parameter for indicating a number of common search spaces for a bandwidth part (BWP), a parameter for indicating a preferred number of search spaces associated with the UE for the bandwidth part (BWP), a parameter for indicating a minimum periodicity for common search spaces, or a parameter for indicating a minimum periodicity for the search spaces associated with the UE.

27. An apparatus for wireless communication, comprising:
means for obtaining configuration information for a user equipment (UE) assistance information message, the configuration information indicating a set of parameters the apparatus is allowed to indicate in the UE assistance information message, the set of parameters including at least one of an operation complexity control parameter, a network coverage control parameter, or a channel monitoring control parameter;
means for transmitting the UE assistance information message to a base station, wherein the UE assistance information message is based on at least a portion of the set of parameters;
means for receiving, from the base station, a radio resource control (RRC) reconfiguration message based on the UE assistance information message; and
means for performing one or more operations based on the RRC reconfiguration message.

28. A non-transitory computer-readable medium storing computer executable code, the code when executed by a processor cause the processor to:
obtain configuration information for a user equipment (UE) assistance information message, the configuration information indicating a set of parameters a user equipment (UE) is allowed to indicate in the UE assistance information message, the set of parameters including at least one of an operation complexity control parameter, a network coverage control parameter, or a channel monitoring control parameter;
transmit the UE assistance information message to a base station, wherein the UE assistance information message is based on at least a portion of the set of parameters;
receive, from the base station, a radio resource control (RRC) reconfiguration message based on the UE assistance information message; and
perform one or more operations based on the RRC reconfiguration message.

* * * * *